United States Patent
Kaulgud et al.

(10) Patent No.: US 10,289,524 B2
(45) Date of Patent: May 14, 2019

(54) WORKFLOW TEST CASE GENERATION

(71) Applicant: Accenture Global Services Limited, Dublin (IE)

(72) Inventors: Vikrant Shyamkant Kaulgud, Pune (IN); Manisha Sriraman, Bangalore (IN); Vibhu Saujanya Sharma, Bangalore (IN); Venkatesh Subramanian, Bangalore (IN); Namrata Maheshwary, Bangalore (IN); Chethana Dinakar, Domlur (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 568 days.

(21) Appl. No.: 14/732,259

(22) Filed: Jun. 5, 2015

(65) Prior Publication Data
US 2016/0004622 A1 Jan. 7, 2016

(30) Foreign Application Priority Data
Jun. 6, 2014 (IN) .......................... 2779/CHE/2014

(51) Int. Cl.
*G06F 11/36* (2006.01)
(52) U.S. Cl.
CPC ...... *G06F 11/3612* (2013.01); *G06F 11/3684* (2013.01)
(58) Field of Classification Search
CPC ........... G06F 8/00–8/78; G06F 11/36–11/3696
See application file for complete search history.

(56) References Cited

U.S. PATENT DOCUMENTS

| 5,630,069 | A | 5/1997 | Flores et al. |
| 6,237,020 | B1 * | 5/2001 | Leymann .................. G06F 8/61 709/201 |
| 7,100,195 | B1 * | 8/2006 | Underwood ........... G06F 9/451 726/2 |
| 7,370,325 | B1 | 5/2008 | Hull et al. |
| 7,734,492 | B2 | 6/2010 | Sun et al. |

(Continued)

OTHER PUBLICATIONS

"Patent Examination Report No. 1", Australia Patent Application No. 2015203263, IP Australia, dated Jul. 28, 2015, 7 pages.

(Continued)

*Primary Examiner* — S. Sough
*Assistant Examiner* — Joanne G Macasiano
(74) *Attorney, Agent, or Firm* — Mannava & Kang, P.C.

(57) ABSTRACT

Workflow test case generation may include receiving an intermediate output of a workflow. The intermediate output of the workflow may reference a plurality of workflow building blocks that provide a specified functionality at each step of the workflow. Workflow definitions of the intermediate output of the workflow may be analyzed to generate a graph structure that represents the workflow. Building block attributes that include an identification of attributes for the plurality of workflow building blocks, and the graph structure may be analyzed to generate building block and attribute information for the workflow. The building block and attribute information and the graph structure may be analyzed to generate test paths for the workflow. The building block and attribute information, the test paths, and a plurality of test case templates may be analyzed to generate test artifacts that include testing to be performed for the workflow.

20 Claims, 39 Drawing Sheets

(56) References Cited

U.S. PATENT DOCUMENTS

| | | | |
|---|---|---|---|
| 8,181,150 B2* | 5/2012 | Szpak | G06F 8/10 |
| | | | 717/104 |
| 8,645,854 B2 | 2/2014 | Kopycinski et al. | |
| 9,317,254 B1* | 4/2016 | Yim | G06F 8/20 |
| 2003/0084429 A1* | 5/2003 | Schaefer | G06F 11/3664 |
| | | | 717/125 |
| 2005/0066304 A1* | 3/2005 | Tattrie | G06F 8/20 |
| | | | 717/101 |
| 2006/0129443 A1* | 6/2006 | Chen | G06F 8/34 |
| | | | 715/771 |
| 2006/0178918 A1* | 8/2006 | Mikurak | G06Q 10/06 |
| | | | 705/7.25 |
| 2006/0235964 A1 | 10/2006 | Childress et al. | |
| 2009/0018882 A1 | 1/2009 | Burton et al. | |
| 2010/0077260 A1 | 3/2010 | Pillai et al. | |
| 2011/0113287 A1* | 5/2011 | Gururaj | G06F 11/0766 |
| | | | 714/37 |
| 2012/0110384 A1* | 5/2012 | Brunet | G06F 11/3624 |
| | | | 714/37 |
| 2012/0215723 A1* | 8/2012 | Petri | G06Q 10/0633 |
| | | | 705/400 |
| 2013/0145300 A1 | 6/2013 | MacKay et al. | |
| 2014/0067448 A1 | 3/2014 | Joshi et al. | |

OTHER PUBLICATIONS

"The extended European search report", European Application No. 15171011.8, European Patent Office, dated Sep. 18, 2015, 4 pages.

\* cited by examiner

```
<rowdata REPEATINGINDEX="TRANSITION53">
......
<pyFrom>Start51</pyFrom>
................
<pxSubscript>TRANSITION53</pxSubscript>
<pyTo>ASSIGNMENT63</pyTo>
<pyAuditNote/>
.........
</rowdata>
```

FIG. 3A

```
                                                                    300
        Key = StartAccenturePegaDemo.xml:                          /
        Values = FlowSteps [transistionId=TRANSITION53, fromNode=Start51,
        toNode=ASSIGNMENT63]n
        Values = FlowSteps [transistionId=TRANSITION54, fromNode=ASSIGNMENT63,
        toNode=Utility1]n
        Values = FlowSteps [transistionId=Transition4, fromNode=Utility1, toNode=Utility4]n
        Values = FlowSteps [transistionId=Transition8, fromNode=Utility4,
        toNode=Assignment1]n
        Values = FlowSteps [transistionId=Transition5, fromNode=Assignment1,
        toNode=SubProcess1]n
        Values = FlowSteps [transistionId=Transition1, fromNode=SubProcess1,
        toNode=Decision1]n
        Values = FlowSteps [transistionId=Transition2, fromNode=Decision1, toNode=Utility2]n   302
        Values = FlowSteps [transistionId=Transition6, fromNode=Utility2, toNode=END52]n
        Values = FlowSteps [transistionId=Transition3, fromNode=Decision1, toNode=Utility3]n
Values = FlowSteps [transistionId=Transition7, fromNode=Utility3, toNode=END52]n
```

FIG. 3B

```
Key = SaveOrder.xml:StartAccenturePegaDemo.xml:SubProcess1
Values = FlowSteps [transistionId=Transition2, fromNode=Start51, toNode=SubProcess1]n
Values = FlowSteps [transistionId=Transition3, fromNode=SubProcess1, toNode=Integrator1]n
Values = FlowSteps [transistionId=TRANSITION54, fromNode=Integrator1, toNode=Assignment1]n
Values = FlowSteps [transistionId=Transition1, fromNode=Assignment1, toNode=END52]n
```

FIG. 3C

```
<rowdata REPEATINGINDEX="TRANSITION54">
<pvExpression>CreateNewCustomer</pvExpression>
...
<pyWorkStatus>New</pyWorkStatus>
..
<pyFrom>ASSIGNMENT63</pyFrom>
..
<pyMOName>Create New Customer</pyMOName>
...
<pxSubscript>TRANSITION54</pxSubscript>
..
<pyTo>Utility1</pyTo>
..
<pyConditionType>Action</pyConditionType>
..
<pyFlowType>FlowStandard</pyFlowType>
..
<pyMONameOrig>Create New Customer</pyMONameOrig>
<pyLastExpression>ActionStub</pyLastExpression>
<pyUseCaseName>CreateNewCustomer</pyUseCaseName>
..
</rowdata>
```

FIG. 3D

```
<node id="StartAccenturePegaDemo.xml:ASSIGNMENT63">
    <data key="fields">First Name,Last Name,SSN,</data>
    <data key="isRouterPres">false</data>
    <data key="isSLAPres">true</data>
    <data key="nodeId">StartAccenturePegaDemo.xml:ASSIGNMENT63</data>
    <data key="routerName"></data>
    <data key="ruleName">Create New Customer</data>
    <data key="ruleType">FlowAction</data>
    <data key="taskLabel">Create New Customer</data>
    <data key="useCaseName">CreateNewCustomer</data>
    <data key="workStatus">New</data>
</node>
```

FIG. 3E

```
#if ($taskLabel)
enter the values for creating $taskLabel
#end
#if ($workItemStatus)
check work item status
#end
```

FIG. 3F

```
<node id="Rule-Obj-Flow#StartCorpXYZPegaDemo:ASSIGNMENT63">
..........................................
.........................
        <data key="harnessPurpose">flowaction#Perform</data>
        <data key="instructions">flowaction#</data>
        <data key="isRouterPres">false</data>
        <data key="isSLAPres">true</data>
        <data key="pyMoName">Create New Customer</data>
        <data key="routerName"></data>
        <data key="ruleName">CreateNewCustomer</data>
        <data key="ruleType">flowaction</data>
        <data key="taskLabel">CreateNewCustomer</data>
          <data key="useCaseName">CreateNewCustomer</data>
        <data key="workStatus">New</data>
      </node>
```

```xml
<?xml version="1.0"?>
<graphml xsi:schemaLocation="http://graphml.graphdrawing.org/xmlns
    http://graphml.graphdrawing.org/xmlns/1.1/graphml.xsd"
    xmlns:xsi="http://www.w3.org/2001/XMLSchema-instance"
    xmlns="http://graphml.graphdrawing.org/xmlns">
    <key attr.type="string" attr.name="approvalType" for="node" id="approvalType"/>
    <key attr.type="string" attr.name="assignmentServiceName" for="node"
        id="assignmentServiceName"/>
    <key attr.type="string" attr.name="assignmentServiceWorkStatus" for="node"
        id="assignmentServiceWorkStatus"/>
    <key attr.type="string" attr.name="attContentAuditNote" for="node"
        id="attContentAuditNote"/>
    <key attr.type="string" attr.name="attContentBinaryFilePath" for="node"
        id="attContentBinaryFilePath"/>
    <key attr.type="string" attr.name="attContentCategory" for="node"
        id="attContentCategory"/>
    <key attr.type="string" attr.name="attContentDescription" for="node"
        id="attContentDescription"/>
    <key attr.type="string" attr.name="attContentFileRef" for="node" id="attContentFileRef"/>
    <key attr.type="string" attr.name="attContentNote" for="node" id="attContentNote"/>
    <key attr.type="string" attr.name="attContentType" for="node" id="attContentType"/>
    <key attr.type="string" attr.name="attContentUrl" for="node" id="attContentUrl"/>
    <key attr.type="string" attr.name="caseType" for="node" id="caseType"/>
    <key attr.type="string" attr.name="caseTypeWaitFor" for="node" id="caseTypeWaitFor"/>
    <key attr.type="string" attr.name="checkAvailablity" for="node" id="checkAvailablity"/>
    <key attr.type="string" attr.name="confirmationNote" for="node" id="confirmationNote"/>
    <key attr.type="string" attr.name="createCaseClass" for="node" id="createCaseClass"/>
    <key attr.type="string" attr.name="createCaseMode" for="node" id="createCaseMode"/>
    <key attr.type="string" attr.name="decisionResult" for="node" id="decisionResult"/>
    <key attr.type="string" attr.name="decisionTable" for="node" id="decisionTable"/>
    <key attr.type="string" attr.name="fields" for="node" id="fields"/>
    <key attr.type="string" attr.name="harnessPurpose" for="node" id="harnessPurpose"/>
    <key attr.type="string" attr.name="instructions" for="node" id="instructions"/>
    <key attr.type="string" attr.name="isEmailApproval" for="node" id="isEmailApproval"/>
    <key attr.type="string" attr.name="isRouterPres" for="node" id="isRouterPres"/>
    <key attr.type="string" attr.name="isSLAPres" for="node" id="isSLAPres"/>
    <key attr.type="string" attr.name="isSwimLane" for="node" id="isSwimLane"/>
    <key attr.type="string" attr.name="levels" for="node" id="levels"/>
    <key attr.type="string" attr.name="localFlowAction" for="node" id="localFlowAction"/>
    <key attr.type="string" attr.name="managerType" for="node" id="managerType"/>
    <key attr.type="string" attr.name="nodeId" for="node" id="nodeId"/>
    <key attr.type="string" attr.name="pdfAttcategory" for="node" id="pdfAttcategory"/>
    <key attr.type="string" attr.name="pdfAuditNote" for="node" id="pdfAuditNote"/>
    <key attr.type="string" attr.name="pdfName" for="node" id="pdfName"/>
    <key attr.type="string" attr.name="pdfSectionName" for="node" id="pdfSectionName"/>
    <key attr.type="string" attr.name="persistCaseName" for="node" id="persistCaseName"/>
    <key attr.type="string" attr.name="ptpActor" for="node" id="ptpActor"/>
    <key attr.type="string" attr.name="ptpAuditNote" for="node" id="ptpAuditNote"/>
    <key attr.type="string" attr.name="ptpMessage" for="node" id="ptpMessage"/>
```

FIG. 5

```xml
<key attr.type="string" attr.name="pyMoName" for="node" id="pyMoName"/>
<key attr.type="string" attr.name="reachStatus" for="node" id="reachStatus"/>
<key attr.type="string" attr.name="routerName" for="node" id="routerName"/>
<key attr.type="string" attr.name="ruleName" for="node" id="ruleName"/>
<key attr.type="string" attr.name="ruleType" for="node" id="ruleType"/>
<key attr.type="string" attr.name="scopeType" for="node" id="scopeType"/>
<key attr.type="string" attr.name="sendMailAttachmentType" for="node"
    id="sendMailAttachmentType"/>
<key attr.type="string" attr.name="sendMailAttachmentcategories" for="node"
    id="sendMailAttachmentcategories"/>
<key attr.type="string" attr.name="sendMailAuditNote" for="node" id="sendMailAuditNote"/>
<key attr.type="string" attr.name="sendMailCorrTemplate" for="node"
    id="sendMailCorrTemplate"/>
<key attr.type="string" attr.name="sendMailIsAttachment" for="node"
    id="sendMailIsAttachment"/>
<key attr.type="string" attr.name="sendMailMessage" for="node" id="sendMailMessage"/>
<key attr.type="string" attr.name="sendMailMessageType" for="node"
    id="sendMailMessageType"/>
<key attr.type="string" attr.name="sendMailParties" for="node" id="sendMailParties"/>
<key attr.type="string" attr.name="sendMailSubject" for="node" id="sendMailSubject"/>
<key attr.type="string" attr.name="sendMailTo" for="node" id="sendMailTo"/>
<key attr.type="string" attr.name="sendMailType" for="node" id="sendMailType"/>
<key attr.type="string" attr.name="splitCategory" for="node" id="splitCategory"/>
<key attr.type="string" attr.name="splitForEachCategory" for="node"
    id="splitForEachCategory"/>
<key attr.type="string" attr.name="splitForEachPageClass" for="node"
    id="splitForEachPageClass"/>
<key attr.type="string" attr.name="splitForEachStatus" for="node" id="splitForEachStatus"/>
<key attr.type="string" attr.name="splitForEachSubProcessName" for="node"
    id="splitForEachSubProcessName"/>
<key attr.type="string" attr.name="splitInstructions" for="node" id="splitInstructions"/>
<key attr.type="string" attr.name="splitOperator" for="node" id="splitOperator"/>
<key attr.type="string" attr.name="splitServiceLevel" for="node" id="splitServiceLevel"/>
<key attr.type="string" attr.name="splitStatus" for="node" id="splitStatus"/>
<key attr.type="string" attr.name="splitSubProcess" for="node" id="splitSubProcess"/>
<key attr.type="string" attr.name="stageName" for="node" id="stageName"/>
<key attr.type="string" attr.name="stepName" for="node" id="stepName"/>
<key attr.type="string" attr.name="swimLaneCheckAvailabilty" for="node"
    id="swimLaneCheckAvailabilty"/>
<key attr.type="string" attr.name="swimLaneName" for="node" id="swimLaneName"/>
<key attr.type="string" attr.name="swimLaneRouterName" for="node"
    id="swimLaneRouterName"/>
<key attr.type="string" attr.name="taskLabel" for="node" id="taskLabel"/>
<key attr.type="string" attr.name="transactionId" for="node" id="transactionId"/>
<key attr.type="string" attr.name="useCaseName" for="node" id="useCaseName"/>
<key attr.type="string" attr.name="waitDateTime" for="node" id="waitDateTime"/>
<key attr.type="string" attr.name="waitFor" for="node" id="waitFor"/>
<key attr.type="string" attr.name="waitTimeIntravel" for="node" id="waitTimeIntravel"/>
<key attr.type="string" attr.name="waitType" for="node" id="waitType"/>
```

FIG. 5 (CONT)

```xml
<key attr.type="string" attr.name="waitWorkBasket" for="node" id="waitWorkBasket"/>
<key attr.type="string" attr.name="whenRules" for="node" id="whenRules"/>
<key attr.type="string" attr.name="workStatus" for="node" id="workStatus"/>
<key attr.type="float" attr.name="weight" for="edge" id="weight"/>
<graph id="G" edgedefault="directed">
    <node id="END52">
        <data key="checkAvailablity"/>
        <data key="decisionResult"/>
        <data key="fields"/>
        <data key="isRouterPres">false</data>
        <data key="isSLAPres">false</data>
        <data key="localFlowAction"/>
        <data key="nodeId">END52</data>
        <data key="pyMoName"/>
        <data key="routerName"/>
        <data key="ruleName"/>
        <data key="ruleType"/>
        <data key="stageName"/>
        <data key="stepName"/>
        <data key="taskLabel"/>
        <data key="transactionId"/>
        <data key="useCaseName"/>
        <data key="workStatus"/>
    </node>
    <node id="Rule-Obj-Flow#CheckQuantity:Assignment1">
        <data key="checkAvailablity">false</data>
        <data key="confirmationNote">flowaction#</data>
        <data key="decisionResult">Approval By Manager</data>
        <data key="fields"/>
        <data key="harnessPurpose">flowaction#Perform</data>
        <data key="instructions">flowaction#</data>
        <data key="isRouterPres">true</data>
        <data key="isSLAPres">false</data>
        <data key="isSwimLane"/>
        <data key="localFlowAction"/>
        <data key="nodeId">Rule-Obj-Flow#CheckQuantity:Assignment1</data>
        <data key="pyMoName">ManagerReview</data>
        <data key="routerName">ToOrgUnitManager</data>
        <data key="ruleName">ManagerReview</data>
        <data key="ruleType">flowaction</data>
        <data key="stageName"/>
        <data key="stepName"/>
        <data key="swimLaneCheckAvailablity"/>
        <data key="swimLaneName"/>
        <data key="swimLaneRouterName"/>
        <data key="taskLabel">ManagerReview</data>
        <data key="transactionId">Rule-Obj-Flow#CheckQuantity:Transition3</data>
        <data key="useCaseName"/>
        <data key="workStatus"/>
```

FIG. 5 (CONT)

```xml
</node>
<node id="Rule-Obj-Flow#CheckQuantity:Decision1">
    <data key="checkAvailablity"/>
    <data key="decisionResult"/>
    <data key="fields"/>
    <data key="isRouterPres">false</data>
    <data key="isSLAPres">false</data>
    <data key="isSwimLane"/>
    <data key="localFlowAction"/>
    <data key="nodeId">Rule-Obj-Flow#CheckQuantity:Decision1</data>
    <data key="pyMoName">Approval By Manager</data>
    <data key="routerName"/>
    <data key="ruleName">CheckQuantity</data>
    <data key="ruleType">Decision</data>
    <data key="stageName"/>
    <data key="stepName"/>
    <data key="swimLaneCheckAvailabilty"/>
    <data key="swimLaneName"/>
    <data key="swimLaneRouterName"/>
    <data key="taskLabel">CheckQuantity</data>
    <data key="transactionId">Rule-Obj-Flow#CheckQuantity:Transition1</data>
    <data key="useCaseName"/>
    <data key="workStatus"/>
</node>
<node id="Rule-Obj-Flow#SaveOrder:Assignment1">
    <data key="checkAvailablity"/>
    <data key="confirmationNote">flowaction#</data>
    <data key="decisionResult"/>
    <data key="fields"/>
    <data key="harnessPurpose">flowaction#Perform</data>
    <data key="instructions">flowaction#</data>
    <data key="isRouterPres">false</data>
    <data key="isSLAPres">true</data>
    <data key="isSwimLane"/>
    <data key="localFlowAction"/>
    <data key="nodeId">Rule-Obj-Flow#SaveOrder:Assignment1</data>
    <data key="pyMoName">AddPartyDetails</data>
    <data key="routerName"/>
    <data key="ruleName">AddPartyDetails</data>
    <data key="ruleType">flowaction</data>
    <data key="stageName"/>
    <data key="stepName"/>
    <data key="swimLaneCheckAvailabilty"/>
    <data key="swimLaneName"/>
    <data key="swimLaneRouterName"/>
    <data key="taskLabel">AddPartyDetails</data>
    <data key="transactionId">Rule-Obj-Flow#SaveOrder:Transition1</data>
    <data key="useCaseName"/>
    <data key="workStatus"/>
```

FIG. 5 (CONT)

```xml
</node>
<node id="Rule-Obj-Flow#SaveOrder:Integrator1">
    <data key="checkAvailablity"/>
    <data key="decisionResult">Continue</data>
    <data key="fields"/>
    <data key="isRouterPres">false</data>
    <data key="isSLAPres">false</data>
    <data key="isSwimLane"/>
    <data key="localFlowAction"/>
    <data key="nodeId">Rule-Obj-Flow#SaveOrder:Integrator1</data>
    <data key="pyMoName">[Always]</data>
    <data key="routerName"/>
    <data key="ruleName">SetTotalAmount</data>
    <data key="ruleType">Integrator</data>
    <data key="stageName"/>
    <data key="stepName"/>
    <data key="swimLaneCheckAvailbilty"/>
    <data key="swimLaneName"/>
    <data key="swimLaneRouterName"/>
    <data key="taskLabel">SetTotalAmount</data>
    <data key="transactionId">Rule-Obj-Flow#SaveOrder:TRANSITION54</data>
    <data key="useCaseName"/>
    <data key="workStatus"/>
</node>
<node id="Rule-Obj-Flow#StartAccenturePegaDemo:ASSIGNMENT63">
    <data key="checkAvailablity"/>
    <data key="confirmationNote">flowaction#</data>
    <data key="decisionResult"/>
    <data key="fields"/>
    <data key="harnessPurpose">flowaction#Perform</data>
    <data key="instructions">flowaction#</data>
    <data key="isRouterPres">false</data>
    <data key="isSLAPres">true</data>
    <data key="isSwimLane"/>
    <data key="localFlowAction"/>
    <data key="nodeId">Rule-Obj-
        Flow#StartAccenturePegaDemo:ASSIGNMENT63</data>
    <data key="pyMoName">Create New Customer</data>
    <data key="routerName"/>
    <data key="ruleName">CreateNewCustomer</data>
    <data key="ruleType">flowaction</data>
    <data key="stageName"/>
    <data key="stepName"/>
    <data key="swimLaneCheckAvailbilty"/>
    <data key="swimLaneName"/>
    <data key="swimLaneRouterName"/>
    <data key="taskLabel">CreateNewCustomer</data>
    <data key="transactionId">Rule-Obj-
        Flow#StartAccenturePegaDemo:TRANSITION54</data>
```

FIG. 5 (CONT)

```xml
    <data key="useCaseName">CreateNewCustomer</data>
    <data key="workStatus">New</data>
</node>
<node id="Rule-Obj-Flow#StartAccenturePegaDemo:Assignment1">
    <data key="checkAvailablity">false</data>
    <data key="confirmationNote">flowaction#</data>
    <data key="decisionResult">Approval By Manager</data>
    <data key="fields"/>
    <data key="harnessPurpose">flowaction#Perform</data>
    <data key="instructions">flowaction#</data>
    <data key="isRouterPres">true</data>
    <data key="isSLAPres">false</data>
    <data key="isSwimLane"/>
    <data key="localFlowAction"/>
    <data key="nodeId">Rule-Obj-Flow#StartAccenturePegaDemo:Assignment1</data>
    <data key="pyMoName">PlaceOrder</data>
    <data key="routerName">ToWorklist</data>
    <data key="ruleName">PlaceOrder</data>
    <data key="ruleType">flowaction</data>
    <data key="stageName"/>
    <data key="stepName"/>
    <data key="swimLaneCheckAvailablity"/>
    <data key="swimLaneName"/>
    <data key="swimLaneRouterName"/>
    <data key="taskLabel">PlaceOrder</data>
    <data key="transactionId">Rule-Obj-
        Flow#StartAccenturePegaDemo:Transition5</data>
    <data key="useCaseName"/>
    <data key="workStatus"/>
</node>
<node id="Rule-Obj-Flow#StartAccenturePegaDemo:Decision1">
    <data key="checkAvailablity"/>
    <data key="decisionResult"/>
    <data key="fields"/>
    <data key="isRouterPres">false</data>
    <data key="isSLAPres">false</data>
    <data key="isSwimLane"/>
    <data key="localFlowAction"/>
    <data key="nodeId">Rule-Obj-Flow#StartAccenturePegaDemo:Decision1</data>
    <data key="pyMoName">Approve</data>
    <data key="routerName"/>
    <data key="ruleName">CheckOrderAmount</data>
    <data key="ruleType">Decision</data>
    <data key="stageName"/>
    <data key="stepName"/>
    <data key="swimLaneCheckAvailablity"/>
    <data key="swimLaneName"/>
    <data key="swimLaneRouterName"/>
    <data key="taskLabel">CheckOrderAmount</data>
```

FIG. 5 (CONT)

```xml
        <data key="transactionId">Rule-Obj-
            Flow#StartAccenturePegaDemo:Transition2</data>
        <data key="useCaseName"/>
        <data key="workStatus"/>
    </node>
    <node id="Rule-Obj-Flow#StartAccenturePegaDemo:Utility1">
        <data key="checkAvailablity"/>
        <data key="decisionResult"/>
        <data key="fields"/>
        <data key="isRouterPres">false</data>
        <data key="isSLAPres">false</data>
        <data key="isSwimLane"/>
        <data key="localFlowAction"/>
        <data key="nodeId">Rule-Obj-Flow#StartAccenturePegaDemo:Utility1</data>
        <data key="pyMoName">[Always]</data>
        <data key="routerName"/>
        <data key="ruleName">Save Customer Record</data>
        <data key="ruleType">Activity</data>
        <data key="stageName"/>
        <data key="stepName"/>
        <data key="swimLaneCheckAvailablity"/>
        <data key="swimLaneName"/>
        <data key="swimLaneRouterName"/>
        <data key="taskLabel">Save Customer Record</data>
        <data key="transactionId">Rule-Obj-
            Flow#StartAccenturePegaDemo:Transition4</data>
        <data key="useCaseName"/>
        <data key="workStatus"/>
    </node>
    <node id="Rule-Obj-Flow#StartAccenturePegaDemo:Utility2">
        <data key="checkAvailablity"/>
        <data key="decisionResult">Approve</data>
        <data key="fields"/>
        <data key="isRouterPres">false</data>
        <data key="isSLAPres">false</data>
        <data key="isSwimLane"/>
        <data key="localFlowAction"/>
        <data key="nodeId">Rule-Obj-Flow#StartAccenturePegaDemo:Utility2</data>
        <data key="pyMoName">[Always]</data>
        <data key="routerName"/>
        <data key="ruleName">UpdateStatus</data>
        <data key="ruleType">Activity</data>
        <data key="stageName"/>
        <data key="stepName"/>
        <data key="swimLaneCheckAvailablity"/>
        <data key="swimLaneName"/>
        <data key="swimLaneRouterName"/>
        <data key="taskLabel">UpdateStatus</data>
```

FIG. 5 (CONT)

```xml
            <data key="transactionId">Rule-Obj-
                Flow#StartAccenturePegaDemo:Transition6</data>
            <data key="useCaseName"/>
            <data key="workStatus">Resolved-Completed</data>
        </node>
        <node id="Rule-Obj-Flow#StartAccenturePegaDemo:Utility3">
            <data key="checkAvailablity"/>
            <data key="decisionResult">Reject</data>
            <data key="fields"/>
            <data key="isRouterPres">false</data>
            <data key="isSLAPres">false</data>
            <data key="isSwimLane"/>
            <data key="localFlowAction"/>
            <data key="nodeId">Rule-Obj-Flow#StartAccenturePegaDemo:Utility3</data>
            <data key="pyMoName">[Always]</data>
            <data key="routerName"/>
            <data key="ruleName">UpdateStatus</data>
            <data key="ruleType">Activity</data>
            <data key="stageName"/>
            <data key="stepName"/>
            <data key="swimLaneCheckAvailabilty"/>
            <data key="swimLaneName"/>
            <data key="swimLaneRouterName"/>
            <data key="taskLabel">UpdateStatus</data>
            <data key="transactionId">Rule-Obj-
                Flow#StartAccenturePegaDemo:Transition7</data>
            <data key="useCaseName"/>
            <data key="workStatus">Resolved-Rejected</data>
        </node>
        <node id="Rule-Obj-Flow#StartAccenturePegaDemo:Utility4">
            <data key="checkAvailablity"/>
            <data key="decisionResult"/>
            <data key="fields"/>
            <data key="isRouterPres">false</data>
            <data key="isSLAPres">false</data>
            <data key="isSwimLane"/>
            <data key="localFlowAction"/>
            <data key="nodeId">Rule-Obj-Flow#StartAccenturePegaDemo:Utility4</data>
            <data key="pyMoName">[Always]</data>
            <data key="routerName"/>
            <data key="ruleName">UpdateStatus</data>
            <data key="ruleType">Activity</data>
            <data key="stageName"/>
            <data key="stepName"/>
            <data key="swimLaneCheckAvailabilty"/>
            <data key="swimLaneName"/>
            <data key="swimLaneRouterName"/>
            <data key="taskLabel">UpdateStatus</data>
```

FIG. 5 (CONT)

```xml
        <data key="transactionId">Rule-Obj-
            Flow#StartAccenturePegaDemo:Transition8</data>
        <data key="useCaseName"/>
        <data key="workStatus">Pending-Investigation</data>
</node>
<node id="Start51">
        <data key="checkAvailablity"/>
        <data key="decisionResult"/>
        <data key="fields"/>
        <data key="isRouterPres">false</data>
        <data key="isSLAPres">false</data>
        <data key="isSwimLane"/>
        <data key="localFlowAction"/>
        <data key="nodeId">Start51</data>
        <data key="pyMoName"/>
        <data key="routerName"/>
        <data key="ruleName"/>
        <data key="ruleType"/>
        <data key="stageName"/>
        <data key="stepName"/>
        <data key="swimLaneCheckAvailablty"/>
        <data key="swimLaneName"/>
        <data key="swimLaneRouterName"/>
        <data key="taskLabel"/>
        <data key="transactionId">Rule-Obj-
            Flow#StartAccenturePegaDemo:TRANSITION53</data>
        <data key="useCaseName"/>
        <data key="workStatus"/>
</node>
<edge id="0" label="link" target="Rule-Obj-
    Flow#StartAccenturePegaDemo:ASSIGNMENT63" source="Start51"/>
<edge id="1" label="link" target="Rule-Obj-Flow#StartAccenturePegaDemo:Utility1"
    source="Rule-Obj-Flow#StartAccenturePegaDemo:ASSIGNMENT63"/>
<edge id="10" label="link" target="Rule-Obj-Flow#StartAccenturePegaDemo:Utility2"
    source="Rule-Obj-Flow#StartAccenturePegaDemo:Decision1"/>
<edge id="11" label="link" target="END52" source="Rule-Obj-
    Flow#StartAccenturePegaDemo:Utility2"/>
<edge id="12" label="link" target="Rule-Obj-Flow#StartAccenturePegaDemo:Utility3"
    source="Rule-Obj-Flow#StartAccenturePegaDemo:Decision1"/>
<edge id="13" label="link" target="END52" source="Rule-Obj-
    Flow#StartAccenturePegaDemo:Utility3"/>
<edge id="2" label="link" target="Rule-Obj-Flow#StartAccenturePegaDemo:Utility4"
    source="Rule-Obj-Flow#StartAccenturePegaDemo:Utility1"/>
<edge id="3" label="link" target="Rule-Obj-
    Flow#StartAccenturePegaDemo:Assignment1" source="Rule-Obj-
    Flow#StartAccenturePegaDemo:Utility4"/>
<edge id="4" label="link" target="Rule-Obj-Flow#CheckQuantity:Decision1"
    source="Rule-Obj-Flow#StartAccenturePegaDemo:Assignment1"/>
```

```xml
<edge id="5" label="link" target="Rule-Obj-Flow#CheckQuantity:Assignment1"
    source="Rule-Obj-Flow#CheckQuantity:Decision1"/>
<edge id="6" label="link" target="Rule-Obj-Flow#SaveOrder:Integrator1" source="Rule-
    Obj-Flow#CheckQuantity:Assignment1"/>
<edge id="7" label="link" target="Rule-Obj-Flow#SaveOrder:Integrator1" source="Rule-
    Obj-Flow#CheckQuantity:Decision1"/>
<edge id="8" label="link" target="Rule-Obj-Flow#SaveOrder:Assignment1"
    source="Rule-Obj-Flow#SaveOrder:Integrator1"/>
<edge id="9" label="link" target="Rule-Obj-Flow#StartAccenturePegaDemo:Decision1"
    source="Rule-Obj-Flow#SaveOrder:Assignment1"/>
</graph>
</graphml>
```

FIG. 5 (CONT)

| Unit Test Case ID | Unit Test Case | Usecase ID | Rules Executed | Rule Type | Pre-Conditions | Steps to Execute | Inputs/Test Data | Expected Result |
|---|---|---|---|---|---|---|---|---|
| 1 | 1: Check CreateNewCustomer screen appears a. Check that the Perform harness gets displayed  2: Check for Save Customer Record  3: Check for UpdateStatus  4: Check Work Item routed to Worklist of the operator specified by the Operator parameter  Check PlaceOrder screen appears a. Check that the Perform harness gets displayed  5: Check CheckQuantity  6: Check Integration is performed with an external service to execute SetTotalAmount.  7: Check AddPartyDetails screen appears a. Check that the Perform harness gets displayed  8: Check CheckOrderAmount  9: Check for UpdateStatus | 1: CreateNew Customer | 1: CreateNewCustomer  2: Save Customer Record  3: UpdateStatus  4: PlaceOrder  5: CheckQuantity  6: SetTotalAmount  7: AddPartyDetails  8: CheckOrderAmount  9: UpdateStatus | 2: Activity  3: Activity  4: flowaction  5: Decision  6: Integrator  7: flowaction  8: Decision  9: Activity | | 1: Enter the values for CreateNewCustomer  Check work item status a. Check harness  2: Verify Save Customer Record Check Work Item Status  3: Verify UpdateStatus Check Work Item Status  4: Verify Work Item routed to Worklist of the operator specified by the Operator parameter.  Enter the values for PlaceOrder  Check work item status a. Check harness  5: Verify CheckQuantity Check Work Item Status  6: Verify Integration is performed with an external service to execute SetTotalAmount.  7: Enter the values for AddPartyDetails  Check work item status a. Check harness  8: Verify CheckOrderAmount Check Work Item Status  9: Verify UpdateStatus Check Work Item Status | | 1: CreateNewCustomer screen appears Work Item Status is New a. Harness is Perform  2: Save Customer Record Work Item Status is New  3: UpdateStatus Work Item Status is Pending-Investigation  4: Work Item routed to Worklist of the operator specified by the Operator parameter.  PlaceOrder screen appears Work Item Status is Pending-Investigation a. Harness is Perform  5: CheckQuantity Work Item Status is Pending-Investigation  6: Integration is performed with an external service to execute SetTotalAmount.  7: AddPartyDetails screen appears Work Item Status is Pending-Investigation a. Harness is Perform  8: CheckOrderAmount Work Item Status is Resolved-Completed  9: UpdateStatus Work Item Status is Resolved-Completed |

FIG. 6

```
- <rowdata REPEATINGINDEX="ASSIGNMENT63">
    <pxSubscript>ASSIGNMENT63</pxSubscript>
    <pyTaskLabel>Create New Customer</pyTaskLabel>
    <pxObjClass>Embed-Rule-Obj-Flow-ToTasks</pxObjClass>
    <pyHeight>0.48</pyHeight>
    <pyShapeCoordX>1.44</pyShapeCoordX>
    <pyShapeCoordy>0.024</pyShapeCoordY>
    <pyTaskTransitionType>ASSIGNMENT</pyTaskTransitionType>
    <pyWidth>0.96</pyWidth>
    <pyActivityToQueue>WorkList</pyActivityToQueue>
    <pySLA>WorkSLA</pySLA>
    <pyActivityPageAliases><pyActivityPageAliases>
    <pyLocalActions REPEATINGTYPE="PropertyList"/>
 - <pyActivityCAllParams>
        <StatusAssign/>
        <StatusWork/>
        <Instuctions/>
        <ConfirmationNote/>
        <DoNotPerform>false</DoNotPerform>
        <HarnessPurpose>Perform</HarnessPurpose>
    </pyActivityCallParams>
</rowdata>
```

700 → `<pyTaskLabel>Create New Customer</pyTaskLabel>`

702 → `<pySLA>WorkSLA</pySLA>`

FIG. 7A

```
<?xml version="1.0"?>

<pagedata>
<pzIndexCount>12</pzIndexCount>
<pyUrgencySLA>40</pyUrgencySLA>
<pyCircumstanceProp/>
<pxHostId>8cf036551c4a395f6d2cedddff6e383c</pxHostId>
<pyTemplateDataField/>
<pxOriginalCreateDateTime/>
<pxMoveOriginalKey>RULE-OBJ-SERVICELEVEL WORK- DEFAULT #20110712T005340.378
GMT</pxMoveOriginalKey>
<pxMoveImportOperName>Medhavi Kashyap</pxMoveImportOperName>
<pyUsage>The goal is that each work object will be completed in two days.
The deadline is that each work object must be completed within 5 days.</pyUsage>
<pxOriginalCreateOperator/>
<pyLockRetryInterval>1</pyLockRetryInterval>
<pyClassName>XYZCorporationPegaDemo-Work</pyClassName>
<pyCircumstanceTemplate/>
<pyServiceLevelName>WorkSLA</pyServiceLevelName>
<pyLateActivityIfLocked/>
<pyGoalDefaultHours>0</pyGoalDefaultHours>
<pyJavaStream/>
<pyLateInBusinessDays>false</pyLateInBusinessDays>
<pyLateDefaultSeconds>0</pyLateDefaultSeconds>
<pyInterface/>
<pyDescription>Default service level</pyDescription>
<pyCalculateTimesFrom>ASSIGNSTART</pyCalculateTimesFrom>
<pxInstanceLockedRuleSetVersion/>
<pzRuleSetVersionMinor>01</pzRuleSetVersionMinor>
<pyGoalDefaultMinutes>0</pyGoalDefaultMinutes>
<pyUrgencySLAGoal>10</pyUrgencySLAGoal>          ← 704
<pzInsKey>RULE-OBJ-SERVICELEVEL XYZCORPORATIONPEGADEMO-WORK WORKSLA
#20140213T070220.072 GMT</pzInsKey>
<pyLateDefaultHours>0</pyLateDefaultHours>
<pyNextActionHours/>
<pyRuleEnds/>
<pzRuleSetVersionMajor>01</pzRuleSetVersionMajor>
<pyDeadlineDefaultMinutes>0</pyDeadlineDefaultMinutes>
<pxCreateOpName>Shipra GupJohnta</pxCreateOpName>
<pxMoveFromSystem>sde</pxMoveFromSystem>
<pySpecialtyComponentData/>
<pzIsPrivateCheckOut/>
<pyCircumstanceDate/>
<pyRuleStarts/>
<pyDeadlineActivityIfLocked/>
<pyMaxLateEvents>1</pyMaxLateEvents>
<pxUpdateOpName>Shipra Gupta</pxUpdateOpName>
<pyTemplateInputBox/>
```

FIG. 7B

```xml
<pyCalendar/>
<pyNextActionDays/>
<pyLateDefaultDays>1</pyLateDefaultDays>
<pyHistoryObject>false</pyHistoryObject>
<pyLabel>work service level</pyLabel>
<pyDeadlineDefaultHours>0</pyDeadlineDefaultHours>
<pxInsName>XYZCORPORATIONPEGADEMO-WORK!WORKSLA</pxInsName>
<pyCircumstanceVal/>
<pxMoveOriginalRuleSet>Pega-ProCom</pxMoveOriginalRuleSet>
<pyRuleSet>XYZCorporationPegaDemo</pyRuleSet>
<pyLateActivity>ToOrgUnitManager</pyLateActivity>
<pyUrgencySLADeadline>20</pyUrgencySLADeadline>
<pxInsId>!WORKSLA</pxInsId>
<pyNextActionMinutes/>
<pyLateDefaultMinutes>0</pyLateDefaultMinutes>
<pzOriginalInstanceKey>RULE-OBJ-SERVICELEVEL XYZCORPORATIONPEGADEMO-WORK WORKSLA
#20131212T092818.628 GMT</pzOriginalInstanceKey>
<pyGoalActivityIfLocked/>
<pxSiblingCount/>
<pyBaseRule>false</pyBaseRule>
<pxUpdateSystemID>pega</pxUpdateSystemID>
<pyRuleSetVersion>01-01-03</pyRuleSetVersion>
<pzStatus>valid</pzStatus>
<pyGoalTimeProperty/>
<pxInstanceLockedRuleSet/>
<pyRuleAvailable>Yes</pyRuleAvailable>
<pxMoveImportOperId>MedhaviKashyap</pxMoveImportOperId>
<pyTemporaryObject/>
<pySortDateCircumWithinRSMajor>true</pySortDateCircumWithinRSMajor>
<pxUpdateDateTime>20140213T100029.575 GMT</pxUpdateDateTime>
<pyValueChanged>false</pyValueChanged>
<pyDeadlineActivity>ToOrgUnitManager</pyDeadlineActivity>
<pxUpdateOperator>shipra</pxUpdateOperator>
<pxInstanceLockedKey/>
<pxMoveImportDateTime>20140519T105717.278 GMT</pxMoveImportDateTime>
<pxMoveOriginalRuleSetVersion>06-02-99</pxMoveOriginalRuleSetVersion>
<pyLabelOld>work service level</pyLabelOld>
<pxInstanceLockedCreateDateTime/>
<pxOriginalCreateOpName/>
<pyProjectIDLabel> ( )</pyProjectIDLabel>
<pyTaskID/>
<pzRuleSetVersionPatch>03</pzRuleSetVersionPatch>
<pyUrgencySLALate>30</pyUrgencySLALate>
<pxCreateSystemID>pega</pxCreateSystemID>
<pyRuleName>WorkSLA</pyRuleName>
<pyLockRetries>1</pyLockRetries>
<pyGoalInBusinessDays>true</pyGoalInBusinessDays>
<pyCircumstanceDateProp/>
```

**FIG. 7B
(CONT)**

```
<pyGoalDefaultSeconds>0</pyGoalDefaultSeconds>
<pyMethodStatus/>
<pyGoalDefaultDays>2</pyGoalDefaultDays>
<pyDeadlineInBusinessDays>true</pyDeadlineInBusinessDays>
<pxInstanceLockedBy/>
<pyDeadlineDefaultSeconds>0</pyDeadlineDefaultSeconds>
<pxCreateDateTime>20140213T070220.072 GMT</pxCreateDateTime>
<pyCircumstanceType/>
<pxInstanceLockedDateTime/>
<pyDeadlineTimeProperty/>
<pyReloadForm>true</pyReloadForm>
<pyNextActionProperty/>
<pxCreateOperator>shipra</pxCreateOperator>
<pxObjClass>Rule-Obj-ServiceLevel</pxObjClass>
<pyGoalActivity>ToOrgUnitManager</pyGoalActivity>
<pyProjectID/>
<pyDeadlineDefaultDays>2</pyDeadlineDefaultDays>
<pyHasCustomFields/>
<pyCircumstanceDefinition/>
<pyNextActionSetting>Immediate</pyNextActionSetting>
<pxOriginalCreateSystemID/>
<pyLateActivityParameters>
<pyTempPlaceHolder>TempPlaceHolder</pyTempPlaceHolder>
</pyLateActivityParameters>
<pyGoalActivityIfLockedParameters>
<pyTempPlaceHolder>TempPlaceHolder</pyTempPlaceHolder>
</pyGoalActivityIfLockedParameters>
<pyGoalActivityParameters>
<flowAction/>
<pyTempPlaceHolder>TempPlaceHolder</pyTempPlaceHolder>
</pyGoalActivityParameters>
<pxAPIMethodReferences REPEATINGTYPE="PageList"/>
<pxWarnings REPEATINGTYPE="PageList"/>
<pyDeadlineActivityIfLockedParameters>
<pyTempPlaceHolder>TempPlaceHolder</pyTempPlaceHolder>
</pyDeadlineActivityIfLockedParameters>
<pyDeadlineActivityParameters>
<pyTempPlaceHolder>TempPlaceHolder</pyTempPlaceHolder>
</pyDeadlineActivityParameters>
<pxRuleReferences REPEATINGTYPE="PageList">
<rowdata REPEATINGINDEX="1">
<pyRuleName>ToOrgUnitManager</pyRuleName>
<pxRuleFamilyName>TOORGUNITMANAGER</pxRuleFamilyName>
<pxRuleObjClass>Rule-Obj-Activity</pxRuleObjClass>
<pxObjClass>Embed-Reference-Rule</pxObjClass>
<pxRuleClassName>XYZCorporationPegaDemo-Work</pxRuleClassName>
<pzIndexes REPEATINGTYPE="PropertyGroup">
<rowdata REPEATINGINDEX="RuleReference">10</rowdata>
```

706 → (points to `<pyGoalDefaultDays>` line)
708 → (points to `<pyGoalActivity>` line)

FIG. 7B (CONT)

```
</pzIndexes>
</rowdata>
<rowdata REPEATINGINDEX="2">
<pyRuleName>XYZCorporationPegaDemo-Work</pyRuleName>
<pxRuleFamilyName>XYZCORPORATIONPEGADEMO-WORK</pxRuleFamilyName>
<pxRuleObjClass>Rule-Obj-Class</pxRuleObjClass>
<pxObjClass>Embed-Reference-Rule</pxObjClass>
<pxRuleClassName>XYZCorporationPegaDemo-Work</pxRuleClassName>
<pzIndexes REPEATINGTYPE="PropertyGroup">
<rowdata REPEATINGINDEX="RuleReference">11</rowdata>
</pzIndexes>
</rowdata>
</pxRuleReferences>
<pxNamedPageReferences REPEATINGTYPE="PageList"/>
<pyPagesAndClasses REPEATINGTYPE="PageList">
<rowdata REPEATINGINDEX="1">
<pxObjClass>Embed-PagesAndClasses</pxObjClass>
<pyPagesAndClassesPage/>
<pyPagesAndClassesMode/>
<pyPagesAndClassesClass/>
</rowdata>
</pyPagesAndClasses>
<pyLateActivityIfLockedParameters>
<pyTempPlaceHolder>TempPlaceHolder</pyTempPlaceHolder>
</pyLateActivityIfLockedParameters>
</pagedata>
```

FIG. 7B
(CONT)

| Goal | 10 | 2.0 days | ToOrgUnitManager | 2 | On Create New Customer – If time has passed 2.0 days Then increase current urgency by 10 | 1. Run flow StartCorpXYZPegaDemo 2. Work Item Gets Created 3. Don't work on the Work item for 2.0 days | N/A | Urgency is 50.0 |

FIG. 7C

```
#if ($useCaseName)
On $useCaseName - If time has passed $dayTime
#end
#if ($goal)
then increase current urgency by $goal
#end
```

FIG. 7D

/pagedata/pyModelProcess/pyShapes/rowdata[@REPEATINGINDEX='Assignment1']

FIG. 8A

```
<pyRouterProp>
    <pyMOName/>
    <pxObjClass>Data-MO-Activity-Router</pxObjClass>
    <pyInLane>False</pyInLane>
    <pyImplementation>ToWorklist</pyImplementation>
    <pzRuleParametersShowSkills>false</pzRuleParametersShowSkills>
    <pzRuleParameters REPEATINGTYPE="PageList">
-     <rowdata REPEATINGINDEX="1">
        <pyParametersParamIntelliValidateAs/>
        <pxSubscript>1</pxSubscript>
        <pyParametersParamReq>Y</pyParametersParamReq>
        <pyParametersParamName>Operator</pyParametersParamName>
        <pxListSubscript>1</pxListSubscript>
        <pxObjClass>Embed-MethodParams</pxObjClass>
        <pyParametersParamDefaultValue/>
        <pyParametersParamDesc>ID of the operator to route assignement to</pyParametersParamDesc>
        <pyParametersParamIntelliBaseClass>PageClass</pyParametersParamIntelliBaseClass>
        <pyParametersParamInOut/>
        <pyParametersParamType>STRING</pyParametersParamType>
        <pyParametersParamIntelliRule>Data-Admin-Operator-ID</pyParametersParamIntelliRule>
        <pyParametersParamSize/>
    </rowdata>
-   <rowdata REPEATINGINDEX="2">
        <pyParametersParamIntelliValidateAs/>
        <pxSubscript>2</pxSubscript>
```

```
</pzRuleParameters>
<pyPageAliases></pyPageAliases>
<pxWarningsToDisplay REPEATINGTYPE="PageList"/>
<pySkills REPEATINGTYPE='PageList'>
  - <rowdata REPEATINGINDEX="1">
      <pySkillName/>
      <pySkillRequired/>
      <pxObjClass>Embed-Rule-Obj-Flow-RotuingSkills</pxObjClass>
      <pySkillLevel/>
    </rowdata>
</pySkills>
- <pyCallParams>
    <CheckAvailability>false</CheckAvailability>      ← 802
    <Operator>shipra</Operator>
  </pyCallParams>
</pyRouterProp>
```

FIG. 8B (CONT)

```xml
<node Id="Rule-Obj-Flow#StartCorpXYZPegaDemo:Assignment1">
    <data key="checkAvaliability">false</data>
    <data key="confirmationNote">flowaction#</data>
    <data key="decisionResult">Approval By Manager</data>
    <data key="fields"></data>
    <data key="HarnessPurpose">flowaction#Perform</data>
    <data key="instructions">flowaction#</data>
    <data key="isRouterPres">true</data>
    <data key="isSLAPres">false</data>
    <data key="isSwimLane"></data>
    <data key="localFlowAction"></data>
    <data key="nodeId">Rule-Obj-Flow#StartCorpXYZPegaDemo:Assignment1</data>
    <data key="pyMoName">PlaceOrder</data>
    <data key="routerName">ToWorklist</data>
    <data key="ruleName">PlaceOrder</data>
    <data key="ruleType">flowaction</data>
    <data key="stageName"></data>
    <data key="stepName"></data>
    <data key="swimLaneCheckAvailability"></data>
    <data key="swimLaneName"></data>
    <data key="swimLaneRouterName"></data>
    <data key="taskLabel">PlaceOrder</data>
    <data key="transactionId">Rule-Obj-Flow#StartCorpXYZPegaDemo:Transition5</data>
    <data key="useCaseName"></data>
    <data key="workStatus"></data>
</node>
```

FIG. 8C

| | | | |
|---|---|---|---|
| 1: in StartCorpXYZPegaDemo flow. After PlaceOrder. Check if work item is routed to Worklist of the operator specified by the Operator parameter | 1: CreateNew Customer | 1: CreateNew Customer<br><br>2: Save Customer Record<br><br>3: UpdateStatus<br><br>4: PlaceOrder | 1: flowaction<br><br>2: Activity<br><br>3: Activity<br><br>4: flowaction |

FIG. 8D

```
#set($swimlane = "swimlane")
#set($OOTBrouter = "OOTBRouter")
#if ($fileName)
 In $fileName flow,
#end
#if ($afterTag)
 After $afterTag,
#end
#if($routerType==$OOTBrouter)
#if ($assignee)
 Check if work item is routed to $assignee
#end
#elseif($routerType==$swimlane)
#if ($assignee && $swimlaneName)
 Check if Work item is routed to the Swimlane router $assignee named
$swimlaneName.
#end
#end
```

FIG. 8E

`<pyExpression>CreateNewCustomer</pyExpression>`

FIG. 9A

`<pyLocalActionActivity>TicketActivity</pyLocalActionActivity>`

FIG. 9B

`/pagedata/pySteps/rowdata[pyStepsActivityName='Call SetTicket']/pyStepsCallParams/Ticket`

FIG. 9C

```
<node 1d="Rule-Obj-Flow#StartCorpXYZPegaDemo : ASSIGNMENT63">
  <data key="checkAvailablity"></data>
  <data key="confirmationNote"></data>
  <data key="decisionResult"></data>
  <data key="fields"></data>
  <data key="harnessPurpose">flowaction#Perform</data>
  <data key="isRouterPres">false</data>
  <data key="isSLAPres">false</data>
  <data key="isTicketPresent">true</data>
  <data key="nodeId">Rule-Obj-Flow#StartCorpXYZPegaDemo : ASSIGNMENT63</data>
  <data key="pyMoName"></data>
  <data key="routerName"></data>
  <data key="ruleName"></data>
  <data key="ruleType">flowaction</data>
  <data key="stageName"></data>
  <data key="taskLabel">CreateNewCustomer</data>
  <data key="ticketCaughtAt">Rule-Obj-Flow#StartCorpXYZPegaDemo : Assignment1</data>
  <data key="ticketName">TestTicket</data>
  <data key="ticketThrownAt">Rule-Obj-Flow#StartCorpXYZPegaDemo : Assignment63</data>
  <data key="ticketType">Custom</data>
  <data key="useCaseName"></data>
  <data key="workStatus">New</data>
</node>
```

FIG. 9D

```
#if ($tasklabel)
Check $tasklabel screen appears
#end
#if ($user)
  $subUser. Check user enters
#end
#foreach( $field in $fields )
   $field
#end
#set ($i = 0)
#if ($islocalAction)
#foreach( $action in $localActions )
#set ($i = $i + 1)
$sublocalAction.$i. Check if customer goes to $action local action, then returns to
$tasklabel screen.
#end
#end
#if ($harness)
$subHarness. Check that the $harness harness gets displayed
#end
#if ($instruction)
$subInstruction. Check that the operator receives the instruction to $instruction when
opening the work item
#end
#if ($confirmationNote)
$subConfirmationNote. Check $confirmationNote note appears in the work object
audit trail details after the assignment is completed
#end
```

FIG. 10

```
#if ($tasklabel)
Check for $tasklabel
#end
```

FIG. 11

| Unit Test Case | Usecase ID | Rules Executed | Rule Type | Pre-Conditions | Steps to Execute | Inputs/Test Data | Expected Result |
|---|---|---|---|---|---|---|---|
| 1. Check 'CreateNewCustomer' screen appears 2. Check Customer enters 'First Name', 'Last Nmae', 'SSN' 3. Check for Save Customer Record 4. Check 'PlaceOrder' screen appears 12. Verify that quatity is approved by manager 6. Manager logs in 7. Check 'ManagerReview/' screen appears 8. Manager enters apporval comments 9. Check that the total amount is set 10. Check 'AddPartyDetails' screen appears 11. Verify that order is apporved 12. Check Status of work Item | Place Order | 1. StartAccenturePegaDemo 2. CreateNew Customer 3. Place Order 4. SaveOrder 12. CheckQuality 6. ManagerReview AddParty Details | 1. Flow 2. Flow Action 3. Flow Action 4. Flow 12. Flow 6. Flow Action 7. Flow Action | | 1. Run flow StartCorpXYZPegaDemo, work item gets created 2. Check Work Item Status 3. Enter values for creating new Customer Record 4. Verify Customer record saved 12. Ceck Work Item Status 6. Enter values for placing order 7. Check for order placed 8. Manager enters comments for quantity approval 9. Check if total amount is set 10. Enter the Party Details 11. Check the order is approved 12. Check the status of Work Item | | 1. 'CreateNewCustomer' scr 2. Work item status is 'New 3. Customer Record saved 4. Work item status is 'Ope 12. 'PlaceOrder' screen appe 6. Order gets placed 7. Work item assigned to M Approval 8. Order quantity approved 9. Total Amount is set 10. Party Details are added item 11. Order is approved 12. Work item Status is 're Completed' |

FIG. 12

WORKFLOW TEST CASE GENERATION

PRIORITY

This application claims priority to Indian Provisional Patent Application Number: 2779/CHE/2014, filed Jun. 6, 2014, entitled "Automated Generation of Test Cases for Business Process Management Systems", and Indian Non-Provisional Patent Application Number: 2779/CHE/2014, filed Jun. 4, 2015, entitled "Workflow Test Case Generation", which are incorporated by reference in their entireties.

BACKGROUND

A workflow may include a plurality of steps needed to complete a task. For example, a workflow may include an orchestrated and repeatable pattern of activity provided by the systematic organization of resources that transform materials, provide services, and/or process information. Workflow management may include management of each step of a workflow, for example, for compliance with workflow requirements, quality standards, etc.

BRIEF DESCRIPTION OF DRAWINGS

Features of the present disclosure are illustrated by way of examples shown in the following figures. In the following figures, like numerals indicate like elements, in which:

FIGS. 3A-3G illustrate details of pseudo-code related to the logic flow of the workflow test case generation system of FIG. 1, according to an example of the present disclosure;

FIG. 5 illustrates a graph structure for the workflow of FIG. 4, according to an example of the present disclosure;

FIG. 6 illustrates a test path for the workflow of FIG. 4, according to an example of the present disclosure;

FIGS. 7A-7D illustrate pseudo-code related to a workflow building block including a service level agreement (SLA), according to an example of the present disclosure;

FIGS. 8A-8E illustrate pseudo-code related to a workflow building block including a router, according to an example of the present disclosure;

FIGS. 9A-9D illustrate pseudo-code related to a workflow building block including a ticket, according to an example of the present disclosure;

FIG. 10 illustrates pseudo-code related to a workflow building block including an assignment, according to an example of the present disclosure;

FIG. 11 illustrates pseudo-code related to a workflow building block including a utility, according to an example of the present disclosure;

FIG. 12 illustrates a test artifact for the workflow of FIG. 4, according to an example of the present disclosure

DETAILED DESCRIPTION

Figure 1:
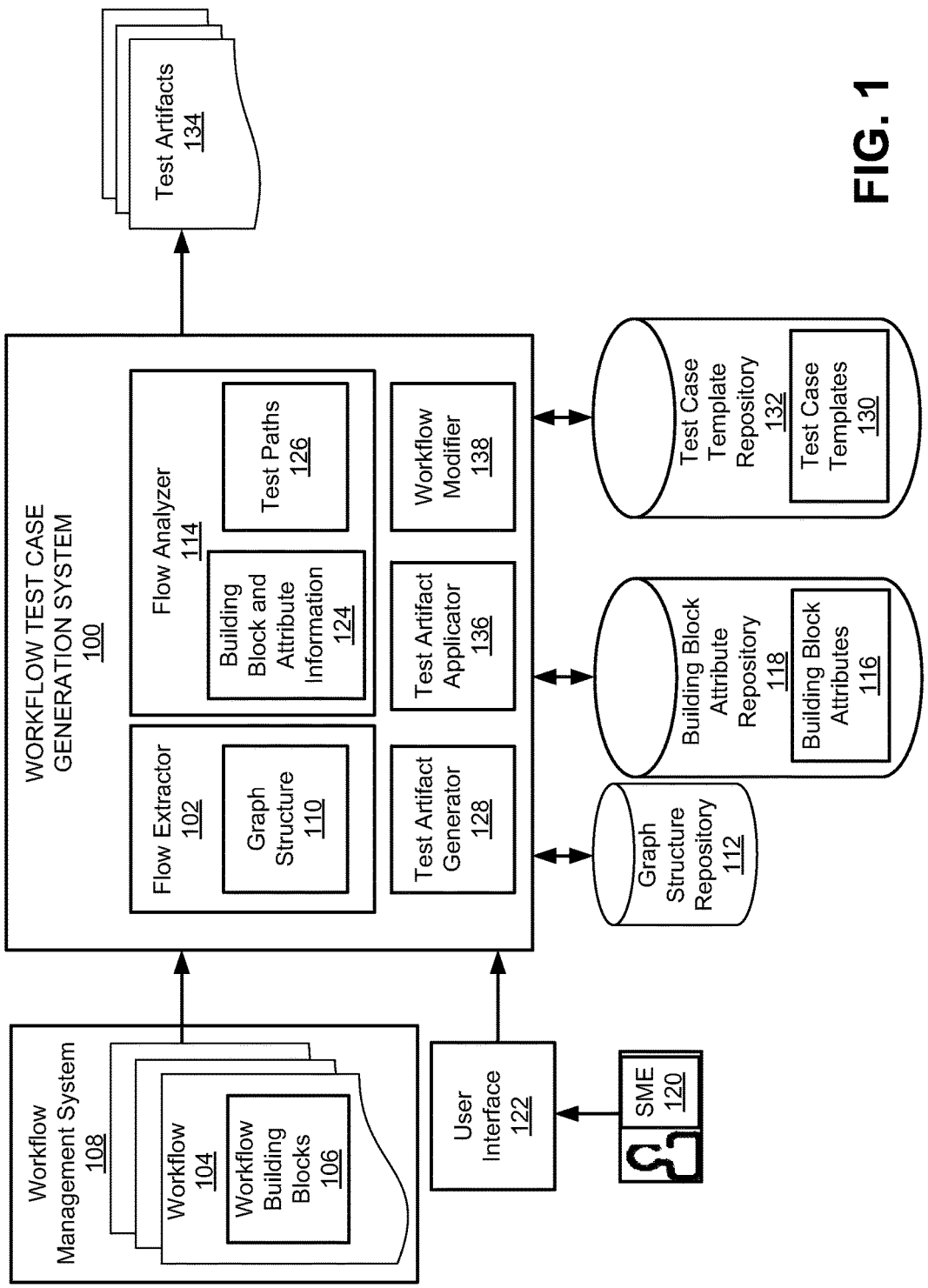
FIG. 1 illustrates a detailed architecture of a workflow test case generation system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Workflow management may include the visual definition of workflows as building blocks, where the code-behind the building blocks is not visible. For example, workflow management tools may include a user interface that supports drag and drop creation of a workflow which may be described as placing workflow building blocks on a canvas and connecting the workflow building blocks with arrows. The visually created workflows may then be interpreted and automatically implemented by a workflow implementation tool for a workflow management system that uses the workflow. The workflow implementation tool may implement the backend code that is needed for deployment of a workflow. In this manner, workflows may be created and implemented without the need to write code.

Examples of workflows that may be created and implemented include e-commerce systems such as catalog management systems, shopping carts, order submission systems, etc. For example, a shopping cart may include a workflow, such as add to cart, remove from cart, etc., that may be defined and implemented through the workflow implementation tool. The workflow implementation tool may also include pre-configured workflow building blocks that may be used to create a workflow.

With respect to implementation of such workflows, a quality assurance testing process is needed to determine whether a workflow meets a desired functional and/or design specification. Based on the complexities associated with such workflows, it can be challenging to objectively and efficiently test such workflows.

In order to address the aforementioned aspects related to testing of workflows, a workflow test case generation system and a method for workflow test case generation are disclosed herein. The system and method disclosed herein may provide for the analysis of complex workflows, application of semantics of different workflow building blocks used in a workflow definition, and use of templates to generate a comprehensive set of test artifacts that include test cases for the associated workflow. The test artifacts may be leveraged for high-quality testing of complex workflows, thereby reducing defects and cost of rework related to such workflows.

With respect to analysis of complex workflows, the system and method disclosed herein may provide for the application of test scenarios related to the test artifacts by a test artifact applicator, with the results of the testing being logged and analyzed for compliance by a workflow modifier. Based on the logging and analysis of the testing, the workflow modifier may modify the workflow under consideration for compliance with requirements and/or quality metrics associated with the workflow under consideration.

The workflow test case generation system and the method for workflow test case generation disclosed herein provide a technical solution to technical problems related, for example, to workflow testing. The system and method disclosed herein provide the technical solution of receiving, by a flow extractor that is executed by at least one hardware processor, an intermediate output of a workflow. The intermediate output of the workflow may reference a plurality of workflow building blocks that provide a specified functionality at each step of the workflow. The system and method disclosed herein may further include analyzing, by the flow extractor, workflow definitions of the intermediate output of the workflow to generate a graph structure that represents the workflow. The system and method disclosed herein may further include receiving, by a flow analyzer that is executed by the at least one hardware processor, building block attributes. The building block attributes may include an identification of attributes for the plurality of workflow building blocks. The system and method disclosed herein may further include analyzing, by the flow analyzer, the building block attributes and the graph structure that represents the workflow to generate building block and attribute information for the workflow. The system and method disclosed herein may further include analyzing, by the flow analyzer, the building block and attribute information and the graph structure that represents the workflow to generate test paths for the workflow. The test paths may represent paths and/or lateral branches of the workflow. The system and method disclosed herein may further include analyzing, by a test artifact generator that is executed by the at least one hardware processor, the building block and attribute information, the test paths, and a plurality of test case templates to generate test artifacts that include testing to be performed for the workflow. The system and method disclosed herein may further include applying, by a test artifact applicator that is executed by the at least one hardware processor, the test artifacts to the workflow, and analyzing, by a workflow modifier that is executed by the at least one hardware processor, the application of the test artifacts to the workflow to determine a compliance of the workflow with a predetermined set of compliance requirements. The system and method disclosed herein may further include modifying, by the workflow modifier, the workflow in response to a determination that the workflow is not in compliance with at least one of the predetermined set of compliance requirements.

FIG. 1 illustrates a detailed architecture of a workflow test case generation system 100, according to an example of the present disclosure. Referring to FIG. 1, the system 100 is depicted as including a flow extractor 102 to receive an intermediate output of a workflow 104, for example, in an XML schema format. An intermediate output of the workflow 104 may be described as an XML representation of the workflow 104 based on a workflow management system (e.g., a workflow management system 108 as described herein). Each workflow management system may include a different XML schema format. The output of the workflow 104 may be provided in one or more XML files that reference various workflow building blocks 106 that, within the workflow management system 108, provide the desired functionality at each step of the workflow 104. Each XML file may represent a single workflow building block or a plurality of workflow building blocks. The XML files may also specify the flow and/or relationship between and/or within the various workflow building blocks 106. The XML files may be designated as XML definition files, and include workflow definitions extracted from the workflow management system 108 that implements the workflow 104. A workflow definition may represent elements such as a sequence between workflow building blocks, a logic related to the workflow 104, service level agreements (SLAs), routing, etc.

The flow extractor 102 may analyze the workflow definitions of the XML definition files to generate a graph structure 110. The graph structure 110 may represent the workflow 104. Further, the graph structure 110 may be stored in a graph structure repository 112. The graph structure 110 may use a node and edge format where each node is a workflow building block, and each edge represents the flow between the workflow building block based, for example, on logic and routing. According to an example, the graph structure 110 may be directed, and may not be annotated with additional information.

A flow analyzer 114 may receive building block attributes 116, for example, from a building block attribute repository 118. The building block attributes 116 may characterize a building block. For example, a building block denoted flow action may include attributes such as name, assigned use case, routing details, SLA, etc. The building block attributes 116 may provide for the identification of attributes for various pre-defined building blocks (e.g., pre-defined building blocks that are used to generate the workflow 104) provided by a workflow management tool. For example, the pre-defined building blocks may include SLA, router, ticket, assignment, utility, activity, etc., types of building blocks. In this regard, each of the pre-defined building blocks may represent a unique semantic. Each unique semantic may be used to process the building block and its attributes for generation of test artifacts as described herein. For example, an assignment may create an assignment task associated with a work object in a workbasket or worklist. The task may be completed by a person or a system (e.g., the workflow management system 108) before the workflow 104 can progress further. The assignment may represent a pause or a potential pause in the workflow 104. A ticket may mark an exception that may arise in the workflow 104, such as a cancellation. A utility may specify an activity to run at a given point in the workflow 104 to perform automated processing without any user assignment. The pre-defined building blocks may include various non-workflow concepts such as packaging and inheritances. Packaging may be used to group functionally cohesive flows in the workflow 104. Inheritance may provide for reuse of common flows across a workflow application. According to an example, the building block attributes 116 may be determined by a subject matter expert (SME) 120 based on an understanding of features and associated XML representations of the workflow building blocks 106. The SME 120 may input the building block attributes 116 using a user interface 122. As different industry packages, including their associated building blocks, are installed and used within the workflow management system 108, different building block attributes may be created and made available in the building block attribute repository 118.

The flow analyzer 114 may reference the building block attributes 116 and the graph structure 110, to generate building block and attribute information 124 for the workflow 104 under test. The flow analyzer 114 may reference the building block and attribute information 124 and the graph structure 110 to generate test paths 126 for the workflow 104 under test. A test path may be described as one path in the graph structure 110, and represent a unique flow that may be taken in the workflow 104 based on the logic of the workflow 104. The test paths 126 may represent paths and/or lateral branches in the workflow 104. Branches may represent multiple paths emanating from a node (representing a workflow building block).

A test artifact generator 128 may receive test case templates 130 from a test case template repository 132. The test case templates 130 may be associated with building blocks or sets of building blocks, and define tests that are to be performed for associated building blocks or sets of building blocks (e.g., the workflow building blocks 106). According to an example, the test case templates may specify tests that are to be performed for individual building blocks. According to another example, the test case templates may specify tests that are to be performed for sets or sequences of building blocks within a flow (e.g., the workflow 104). According to an example, the test case templates 130 may be generated by the SME 120 based, for example, on an understanding of the features and associated functionality of the building blocks that are being used in the workflow 104. As different industry packages, including their associated building blocks, are installed and used within the workflow management system 108, different test case templates may be generated and made available in the test case template repository 132.

The test artifact generator 128 may analyze the building block and attribute information, the test paths 126, and the test case templates 130 to generate test artifacts 134 (including test cases) for the workflow 104 under test. The test artifacts 134 may represent documents detailing test scenarios of the workflow 104. In this regard, the test artifact generator 128 may use the test case templates 130 to extract properties of each workflow building block in the workflow 104, and apply heuristics for generating the test artifacts 134. With respect to the application of heuristics for generating the test artifacts 134, heuristics may include identifying the building blocks and associated attributes, and populating the block specific natural language templates based on this extracted data. The test artifact generator 128 may output and/or store the test artifacts 134 in a human readable format (e.g., a textual format), such as in a spreadsheet or word processor document. The test artifact generator 128 may also analyze the semantics of the workflow building blocks 106 to alter the test artifacts 134, and provide contextual information with respect to the test artifacts 134.

A test artifact applicator 136 may apply the test artifacts to the workflow 104 of the workflow management system 108, with the results of the testing being logged and analyzed for compliance by a workflow modifier 138. The application of the test artifacts to the workflow 104 may provide for end to end traceability between requirements for the workflow management system 108 and the test artifacts 134.

Based on the logging and analysis of the testing, and the end to end traceability between requirements for the workflow management system 108 and the test artifacts 134, the workflow modifier 138 may modify the workflow 104 for compliance with the requirements.

Figure 2:
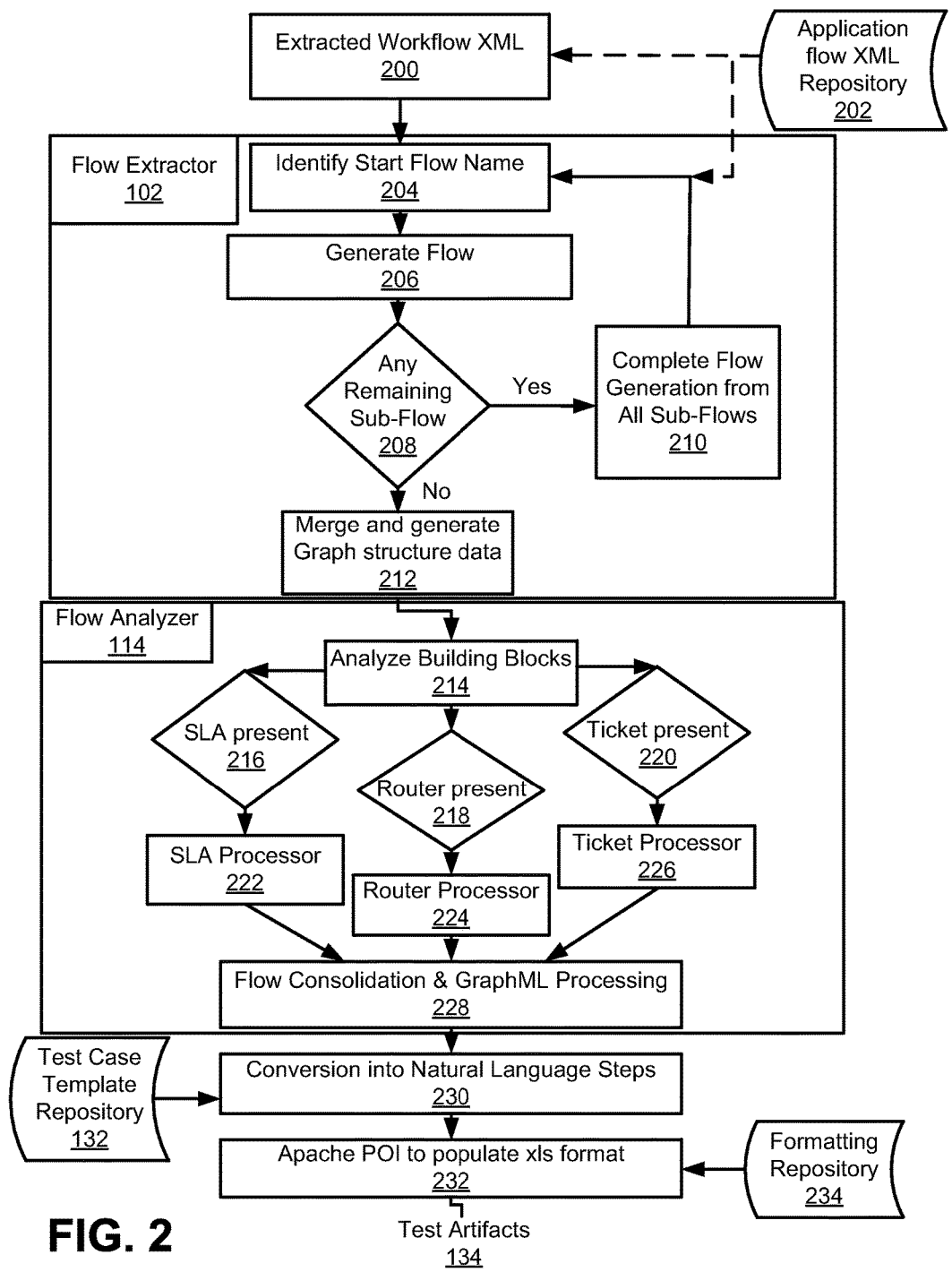
FIG. 2 illustrates a logic flow of the workflow test case generation system of FIG. 1, according to an example of the present disclosure.

FIG. 2 illustrates logic flow of the system 100, according to an example of the present disclosure.

Referring to FIG. 2, the flow extractor 102 may receive an extracted intermediate output (i.e., an extracted workflow XML 200) of the workflow 104, for example, in an XML schema format. The extracted workflow XML 200 may be received from an application flow XML repository 202, or otherwise extracted from the workflow 104. In this regard, the extracted intermediate output of the workflow 104 may include the flow information of the associated application or workflow management system 108, the name of the main flow and/or start flow, and the application name.

At block 204, the flow extractor 102 may identify a start flow name to generate a flow at block 206. In this regard, the extracted workflow XML 200 and the start flow information may be passed to the flow extractor 102, where the flow extractor 102 may reconstruct the flow by parsing the XML. For example, referring to FIGS. 3A and 3B, the flow extractor 102 may identify the start node and end node details from the XML using Xpath, where a "pyStartActivity" tag may include the start node detail (e.g., "Start51" at 300) and a "pyEndingActivities" tag may include the end node detail (e.g., "End52" at 302). The node value may be used to obtain the next node detail, where the start node information may be provided to the Xpath "/pagedata/pyModelProcess/pyConnectors/rowdata[pyFrom='Start51']", which may return the output of FIG. 3A. The process of using the node value to obtain the next node detail may be repeated until the end node is reached. Further, the start node value may be replaced with the next node detail.

At block 208, the flow extractor 102 may determine whether there are any remaining sub flows.

At block 210, in response to a determination at block 208 that there are remaining sub flows, the flow extractor 102 may complete flow generation from all sub-flows.

At block 212, based on the flow generation at block 206 (that includes all sub-flows identified at block 208), the flow generator may merge the flows, and generate the graph structure 110. The output generated by the flow extractor 102 may include, for example, FromNode and ToNode information. For the example of FIG. 3A, FIG. 3B illustrates a main flow and FIG. 3C illustrates a sub-flow. The main flow may be merged with the sub-flow to generate the graph structure 110 which may include the FromNode and ToNode information. The flow details may be received by the flow analyzer 114, where the flow analyzer 114 may again parse the extracted workflow XML 200 to fetch the remaining information needed to generate the test artifacts 134.

At block 214, the flow analyzer 114 may receive the graph structure 110, and analyze the workflow building blocks 106. In this regard, at blocks 216, 218, and 220, the flow analyzer 114 may respectively determine the type of each of the workflow building blocks 106 (e.g., the presence of a SLA, router, ticket, etc., in each of the workflow building blocks 106). In this regard, a workflow building block may be referred to as a SLA building block, a router building block, etc., or as a building block that includes a SLA, a router, etc. Referring to FIGS. 3A-3D, FIG. 3D illustrates an example of pseudo-code for the flow analyzer 114. Referring to FIGS. 3C and 3D, for the sub-flow of FIG. 3C, "TRANSITION54" is of rule type FlowAction, and may be used to fetch all of the information associated with flow action as shown in FIG. 3D.

At blocks 222, 224, and 226, the flow analyzer 114 may respectively process each of the workflow building blocks 106. For the example of FIG. 2, the flow analyzer 114 may respectively process the SLA, the router, and the ticket.

At block 228, the flow analyzer 114 may perform flow consolidation and GraphML processing. The output generated by the flow analyzer 114 may include, for example, TestCase.Graphml. Referring to FIGS. 3A-3E, FIG. 3E illustrates a TestCase.Graphml.

At block 230, the test artifact generator 128 may receive the test case templates 130 from the test case template repository 132, to generate the test artifacts 134. In this regard, at block 230, the test artifact generator 128 may convert the test artifacts 134 to natural language steps for testing of the workflow 104. For example, the test artifact generator 128 may read the GraphML, and use, for example, a velocity Template application programming interface (API) to describe the flows and constraints in natural language. The test artifact generator 128 may read the GraphML by providing the start node and end node details. A different template may be used based on a rule type. For example, referring to FIG. 3F, a FlowAction rule type template is illustrated.

At block 232, the test artifact generator 128 may use Apache POI API to populate, for example, an XLS (e.g., Excel Spreadsheet) format test artifact, based on input from a formatting repository 234.

With respect to operation of the test artifact applicator 136 and the workflow modifier 138, referring to FIG. 3G, from the GraphML, all of the possible paths that may be taken in the workflow 104 may be identified based on logic, for example, by using a third party API. The start node and end node details which are captured from the XML using the Xpath may also be forwarded to the third party API. From each node of the graph structure 110 (representing the workflow building blocks 106), the type (i.e., ruletype) may be identified as shown in FIG. 3G. Referring to FIG. 3G, the type (i.e., ruletype) is denoted at 304. Based on the type and section (column names in XLS (i.e., Unit Test Case/Steps to Execute/Expected Result)) the corresponding template may be extracted and loaded, and converted into natural language. For example, if the type is Flowaction and Section is UnittestCase, then the template loaded is \\TemplateRepository\\stFlowTemplates\\flowActionUnitTestTemplate.vm.

Figure 4:
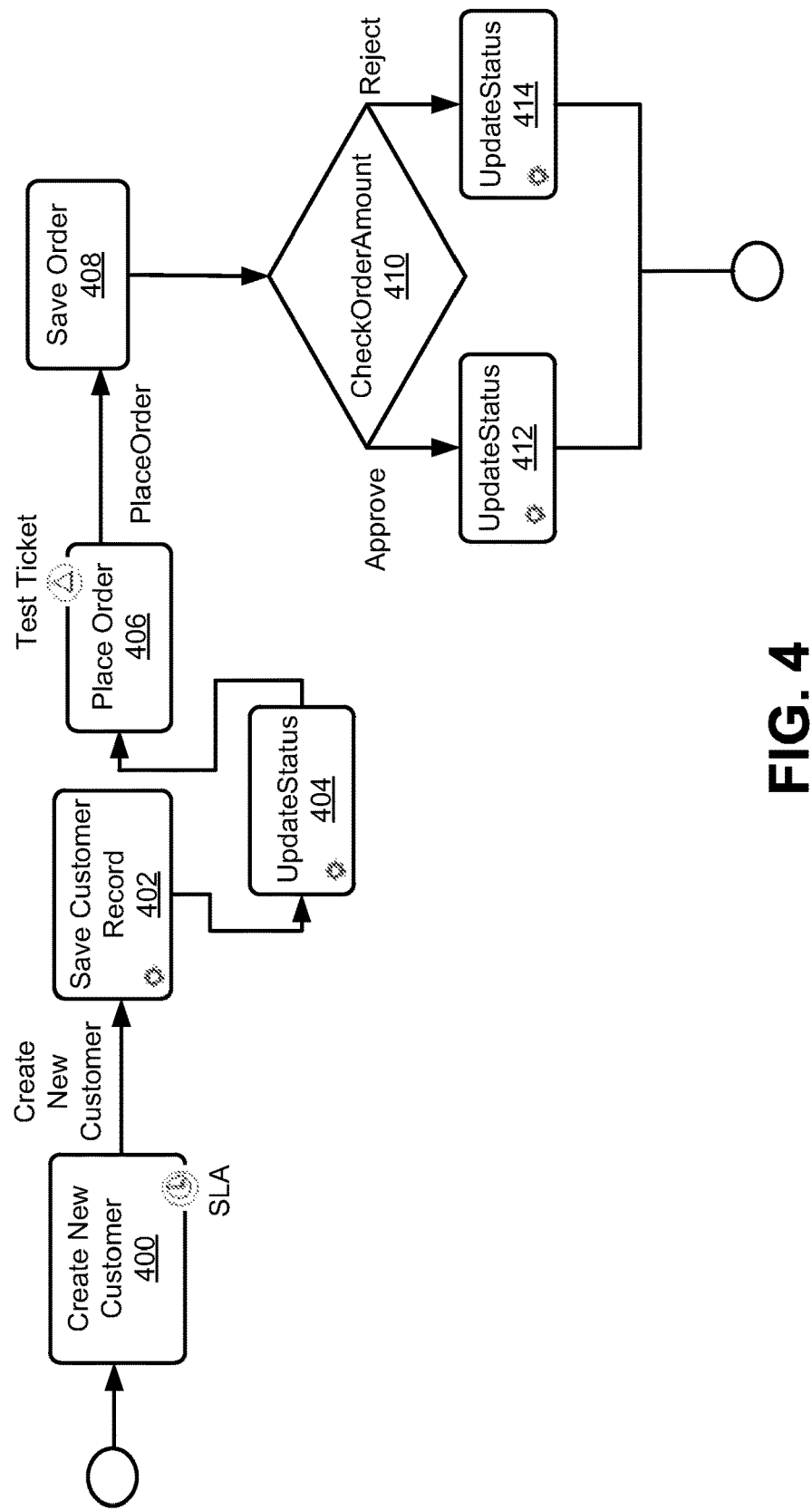
FIG. 4 illustrates a workflow, according to an example of the present disclosure.

FIG. 4 illustrates a workflow, according to an example of the present disclosure.

Referring to FIG. 4, at block 400, a new customer may be created. At block 402, the customer record may be saved. At block 404, a status of the customer may be updated. At block 406, an order may be placed. At block 408, the order related to the order placed at 406 may be saved. At block 410, an amount of the order may be checked. At block 412, in response to a determination that the amount of the order is correct, the order may be approved, and the customer status may be updated. Further, at block 414, in response to a determination that the amount of the order is incorrect, the order may be rejected, and the customer status may be updated.

Referring to FIGS. 2, 4, and 5, FIG. 5 illustrates a graph structure 110 generated by the flow extractor 102 for the example of FIG. 4. Further, FIG. 6 illustrates one of four test paths generated by the flow analyzer 114 for the example of FIG. 4.

Referring to FIGS. 1, 2, 4, and 7A-7D, the flow analyzer 114 may respectively determine the type of each of the workflow building blocks 106 (e.g., the presence of a SLA, router, ticket, etc., in each of the workflow building blocks 106). For example, the block at 400 may include a SLA (or be designated as a SLA). In this regard, with respect to the SLA processor 222, the SLA tab may include the test scripts for SLA. In order to determine (e.g., at block 214) whether a SLA is present or not in the block 400, the pseudo-code for determining whether a SLA is present or not is illustrated in FIG. 7A, for example, at 700 and 702 (e.g., /pagedata/pyTaskInfo/rowdata[@REPEATINGINDEX="{0}"]/pySLA). The "pySLA" tag may indicate whether a SLA is present, and a name of the SLA file. The SLA processor 222 may process the SLA file (i.e., WorkSLA.xml). FIG. 7B illustrates an example of a SLA file. For the SLA file of FIG. 7B, service level standard goal tags are identified at 704, 706, and 708. Using the same process data related to "Deadline", "passedDeadline" may be retrieved. The SLA processor 222 may process all of the data related to the SLA, where the processed data may be written to a graph format (e.g., "output\StartXYZCorporationPegaDemo_SLA_filename.xml"). At block 228, the graph file may be parsed, for example, by using a Gremlin framework. Further, at block 230, the data may be converted into a natural language, for example, by using a velocity template (e.g., "TemplateRepository\sla"). In this regard, FIGS. 7C and 7D respectively illustrate test scripts and a template for the SLA.

Referring to FIGS. 1, 2, 4, and 8A-8E, with respect to the router processor 224, the router tab may include the test scripts for router. In this regard, at block 218, the flow analyzer 114 may determine whether a router is present, for example, by executing the Xpath of FIG. 8A against the input XML (i.e., the extracted workflow XML 200). Referring to FIG. 8B, at 800, the "pyImplementation" tag indicates where it is routed to, and at 802, "checkAvailablity" indicates whether it is routed to as a secondary operator if the primary operator is not available. Data related to the router may be extracted, and written into a graph format (e.g., "output\StartXYZCorporationPegaDemo_FLOW_filename.xml"). FIG. 8C illustrates a GraphML node with router data. Further, at block 230, the data may be converted into a natural language, for example, by using a velocity template (e.g., "TemplateRepository\router"). In this regard, FIGS. 8D and 8E respectively illustrate test scripts and a template for the router.

Referring to FIGS. 1, 2, 4, and 9A-9D, with respect to throwing of a ticket, at block 220, the flow analyzer 114 may determine whether a ticket is present. Referring to FIG. 9A, the flow analyzer 114 may identify the name of the block by using, for example, "/pagedata/pyModelProcess/pyConnectors/rowdata[pyFrom='ASSIGNMENT63']". Referring to FIG. 9B, the flow analyzer 114 may parse the XML, and identify all the activity defined in the block (e.g., "/pagedata/pyLocalActionActivity[text( )]"). The flow analyzer 114 may process the activity XML, and check for rule name 'SetTicket'. Referring to FIG. 9C, the flow analyzer 114 may get the ticket name (i.e., TestTicket). With respect to catching of a ticket that is thrown, the flow analyzer 114 may check for the block which catches the ticket that is thrown (e.g., with respect to FIG. 9C). All of the information related to tickets may be written in a graph format (e.g., "StartXYZCorporationPegaDemo_Ticket_filename.xml"). Referring to FIG. 9D, a sample graph node including ticket data is illustrated. Further, at block 230, the data may be converted into a natural language, for example, by using a velocity template (e.g., "TemplateRepository\ticketTemplates").

According to further examples of building blocks and related templates, FIG. 10 illustrates pseudo-code for a template related to a workflow building block including an assignment, according to an example of the present disclosure. Further, FIG. 11 illustrates pseudo-code for a template related to a workflow building block including a utility, according to an example of the present disclosure.

FIG. 12 illustrates a test artifact for the workflow of FIG. 4, according to an example of the present disclosure.

Referring to FIG. 12, the test artifact 134 for the workflow of FIG. 4 may include unit test case information at 1200, use-case identification at 1202, rules that are executed for the test artifact 134 at 1204, rule types at 1206, preconditions at 1208, steps that are to be executed for the test artifact 134 at 1210, inputs/test data at 1212, and expected results for the corresponding unit test cases and steps to execute at 1214.

The elements of the system 100 may be used with different workflow management systems, and with different sets of preconfigured building blocks or industry packs. The elements of the system 100 may be configured for different uses by providing as inputs different test case templates and different workflow management system building block attributes. Thus, the system 100 may extensible to accommodate new workflow building blocks and/or changes to semantics and/or attributes of existing workflow building blocks.

The elements of the system 100 described herein may be machine readable instructions stored on a non-transitory computer readable medium. In addition, or alternatively, the elements of the workflow test case generation system 100 may be hardware or a combination of machine readable instructions and hardware.

Figure 13:
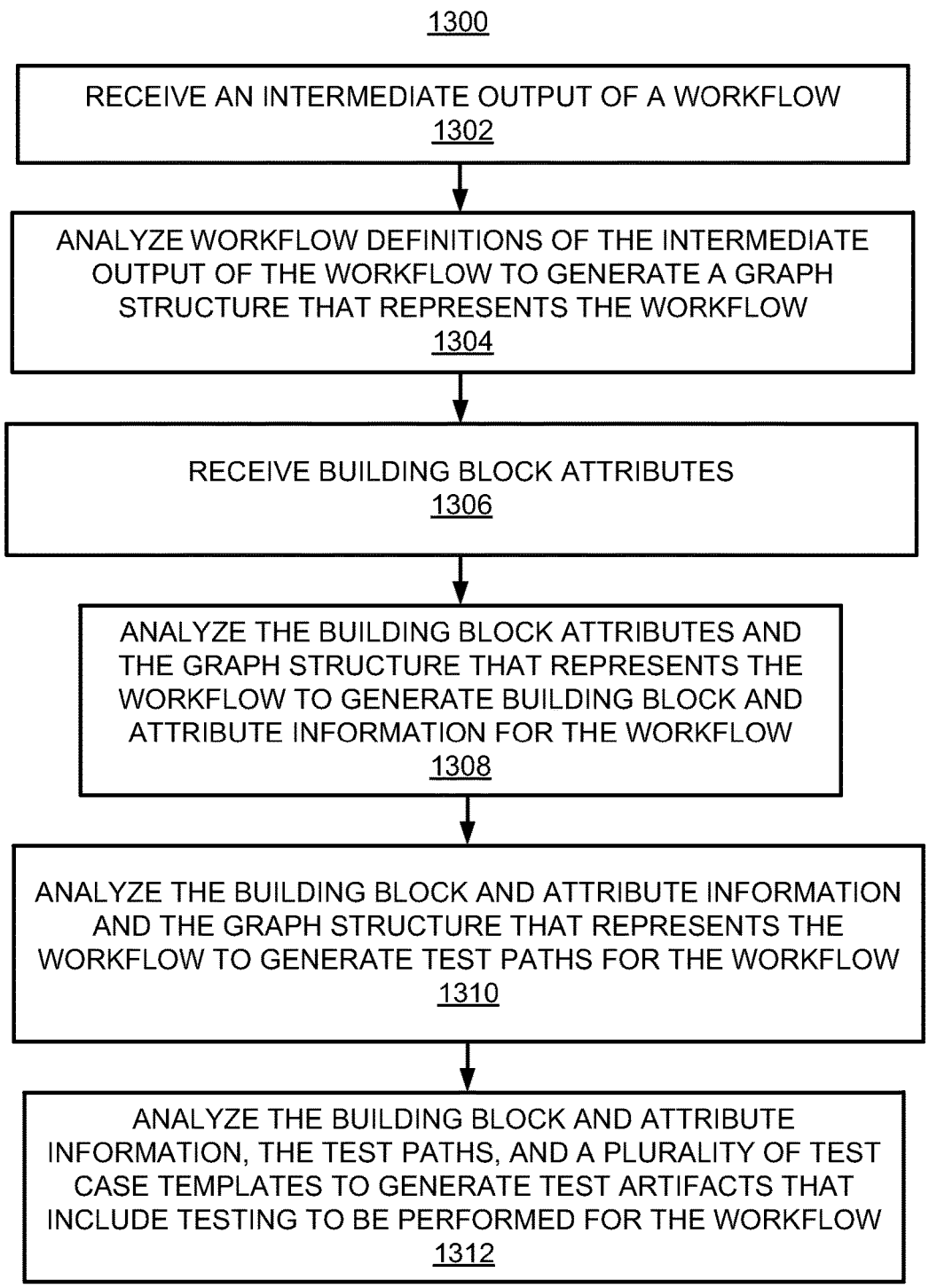
FIG. 13 illustrates a method for workflow test case generation, according to an example of the present disclosure.
Figure 14:
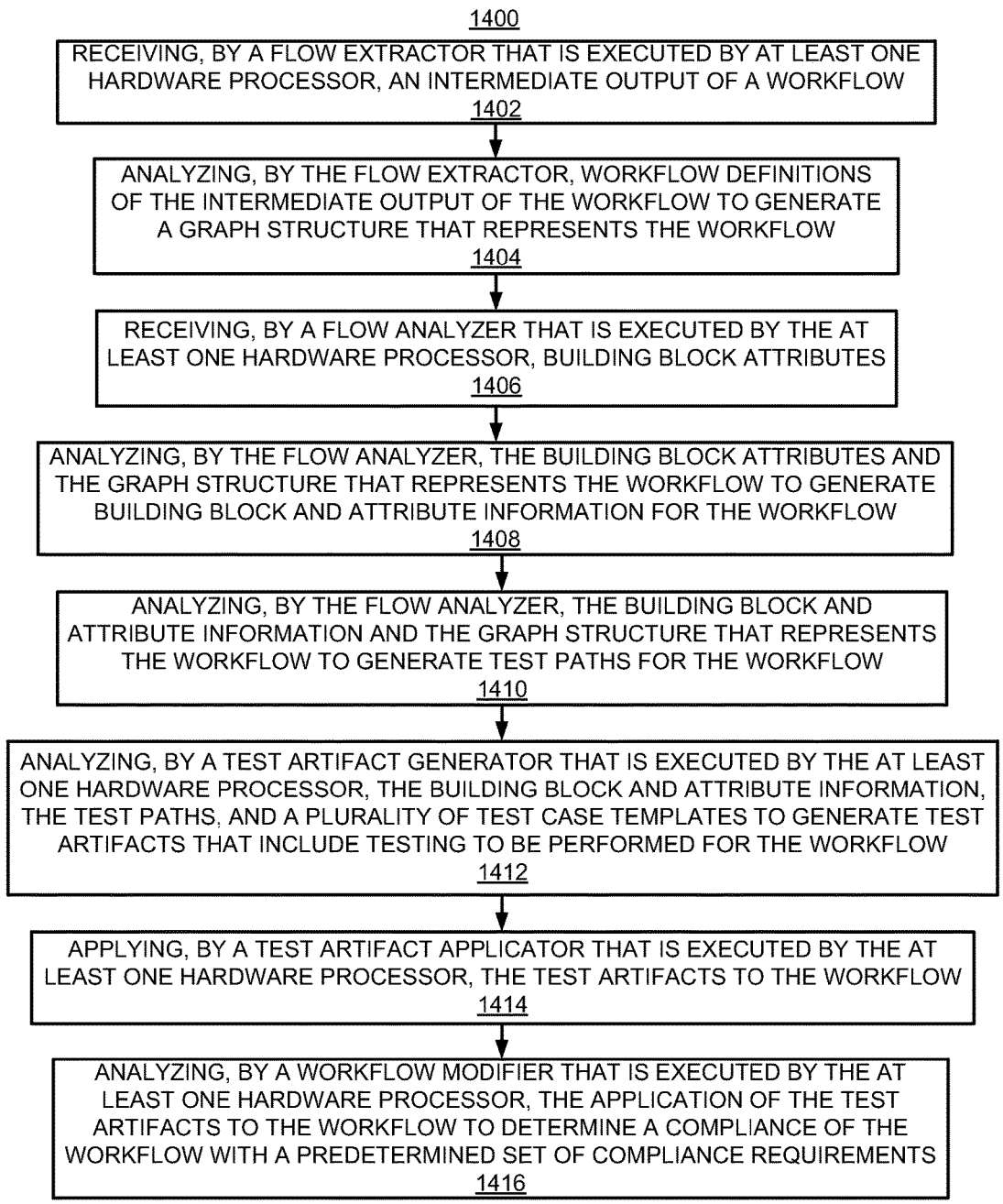
FIG. 14 illustrates further details of the method for workflow test case generation, according to an example of the present disclosure.

FIGS. 13 and 14 illustrate flowcharts of methods 1300 and 1400 for workflow test case generation, according to examples. The methods 1300 and 1400 may be implemented on the workflow test case generation system 100 described above with reference to FIGS. 1-12 by way of example and not limitation. The methods 1300 and 1400 may be practiced in other systems.

Referring to FIGS. 1 and 13, at block 1302, the method 1300 may include receiving an intermediate output of a workflow 104. The intermediate output of the workflow 104 may reference a plurality of workflow building blocks 106 that provide a specified functionality at each step of the workflow 104.

At block 1304, the method 1300 may include analyzing workflow definitions of the intermediate output of the workflow 104 to generate a graph structure 110 that represents the workflow 104.

At block 1306, the method 1300 may include receiving building block attributes 116, where the building block attributes 116 may include an identification of attributes for the plurality of workflow building blocks 106.

At block 1308, the method 1300 may include analyzing the building block attributes 116 and the graph structure 110 that represents the workflow 104 to generate building block and attribute information 124 for the workflow 104.

At block 1310, the method 1300 may include analyzing the building block and attribute information 124 and the graph structure 110 that represents the workflow 104 to generate test paths 126 for the workflow 104, where the test paths 126 may represent paths and/or lateral branches of the workflow 104.

At block 1312, the method 1300 may include analyzing the building block and attribute information 124, the test paths 126, and a plurality of test case templates 130 to generate test artifacts 134 that include testing to be performed for the workflow 104.

According to an example, the intermediate output of the workflow 104 may include an XML schema format.

According to an example, the intermediate output of the workflow 104 may include a XML file that represents a single workflow building block of the plurality of workflow building blocks 106, or the plurality of workflow building blocks 106.

According to an example, a workflow building block of the plurality of workflow building blocks 106 may include a SLA, a router, a ticket, an assignment, a utility, or an activity.

According to an example, the test case templates 130 may be associated with building blocks or sets of building blocks, where the test case templates 130 define tests that are to be performed for the associated building blocks or the sets of building blocks.

According to an example, the method 1300 may include analyzing the building block and attribute information 124, the test paths 126, and a plurality of test case templates 130 to generate test artifacts 134 that include testing to be performed for the workflow 104 by using the test case templates 130 to extract properties of each workflow building block of the plurality of workflow building blocks 106, and applying heuristics to generate the test artifacts 134.

According to an example, the method 1300 may include applying the test artifacts 134 to the workflow 104, and analyzing the application of the test artifacts 134 to the workflow 104 to determine a compliance of the workflow 104 with a predetermined set of compliance requirements.

According to an example, the method 1300 may include modifying the workflow 104 in response to a determination that the workflow 104 is not in compliance with at least one of the predetermined set of compliance requirements.

According to an example, the method 1300 may include generating the graph structure 110 that represents the workflow 104 by identifying start node and end node details from the intermediate output of the workflow 104.

According to an example, the method 1300 may include generating the graph structure 110 that represents the workflow 104 by merging main and sub-flows of the intermediate output of the workflow 104.

Referring to FIGS. 1 and 14, at block 1402, the method 1400 may include receiving, by a flow extractor 102 that is executed by at least one hardware processor (e.g., the hardware processor 1502), an intermediate output of a workflow 104. The intermediate output of the workflow 104 may reference a plurality of workflow building blocks 106 that provide a specified functionality at each step of the workflow 104.

At block 1404, the method 1400 may include analyzing, by the flow extractor 102, workflow definitions of the intermediate output of the workflow 104 to generate a graph structure 110 that represents the workflow 104.

At block 1406, the method 1400 may include receiving, by a flow analyzer 114 that is executed by the at least one hardware processor, building block attributes 116, where the building block attributes 116 may include an identification of attributes for the plurality of workflow building blocks 106.

At block 1408, the method 1400 may include analyzing, by the flow analyzer 114, the building block attributes 116 and the graph structure 110 that represents the workflow to generate building block and attribute information 124 for the workflow 104.

At block 1410, the method 1400 may include analyzing, by the flow analyzer 114, the building block and attribute information 124 and the graph structure 110 that represents the workflow 104 to generate test paths 126 for the workflow 104, where the test paths 126 may represent paths and/or lateral branches of the workflow 104.

At block 1412, the method 1400 may include analyzing, by a test artifact generator 128 that is executed by the at least one hardware processor, the building block and attribute information 124, the test paths 126, and a plurality of test case templates 130 to generate test artifacts 134 that include testing to be performed for the workflow 104.

At block 1414, the method 1400 may include applying, by a test artifact applicator 136 that is executed by the at least one hardware processor, the test artifacts 134 to the workflow 104.

At block 1416, the method 1400 may include analyzing, by a workflow modifier 138 that is executed by the at least one hardware processor, the application of the test artifacts 134 to the workflow 104 to determine a compliance of the workflow 104 with a predetermined set of compliance requirements.

According to an example, for the method 1400, analyzing, by the flow analyzer 114, the building block attributes 116 and the graph structure 110 that represents the workflow 104 to generate the building block and attribute information 124 for the workflow 104 may further include analyzing, by the flow analyzer 114, the building block attributes 116 by using test scripts that are specific to a type of the workflow building block of the workflow building blocks 106 and the graph structure 110 that represents the workflow 104 to generate the building block and attribute information 124 for the workflow 104.

According to an example, for the method 1400, analyzing, by the test artifact generator 128, the building block and attribute information 124, the test paths 126, and the plurality of test case templates 130 to generate the test artifacts 134 that include testing to be performed for the workflow 104, may further include using natural language processing to generate the test artifacts 134 in a human readable format.

According to an example, a method for workflow test case generation may include determining an output of a workflow 104, where the output of the workflow 104 may reference a plurality of workflow building blocks 106 that provide a specified functionality at each step of the workflow 104. The method for workflow test case generation may further include generating a graph structure 110 that represents the workflow 104 based on an analysis of workflow definitions of the output of the workflow 104, and analyzing building block attributes 116 and the graph structure 110 that represents the workflow 104 to generate building block and attribute information 124 for the workflow 104, where the building block attributes 116 may include an identification of attributes for the plurality of workflow building blocks 106. The method for workflow test case generation may further include generating test paths 126 for the workflow 104 based on an analysis of the building block and attribute information 124 and the graph structure 110 that represents the workflow 104, where the test paths 126 may represent paths and/or lateral branches of the workflow 104. The method for workflow test case generation may further include generating test artifacts 134 that include testing to be performed for the workflow 104 based on an analysis of the building block and attribute information 124, the test paths 126, and a plurality of test case templates 130. The method for workflow test case generation may further include analyzing an application of the test artifacts 134 to the workflow 104 to determine a compliance of the workflow 104 with a predetermined set of compliance requirements, and modifying the workflow 104 in response to a determination that the workflow 104 is not in compliance with at least one of the predetermined set of compliance requirements.

Figure 15:
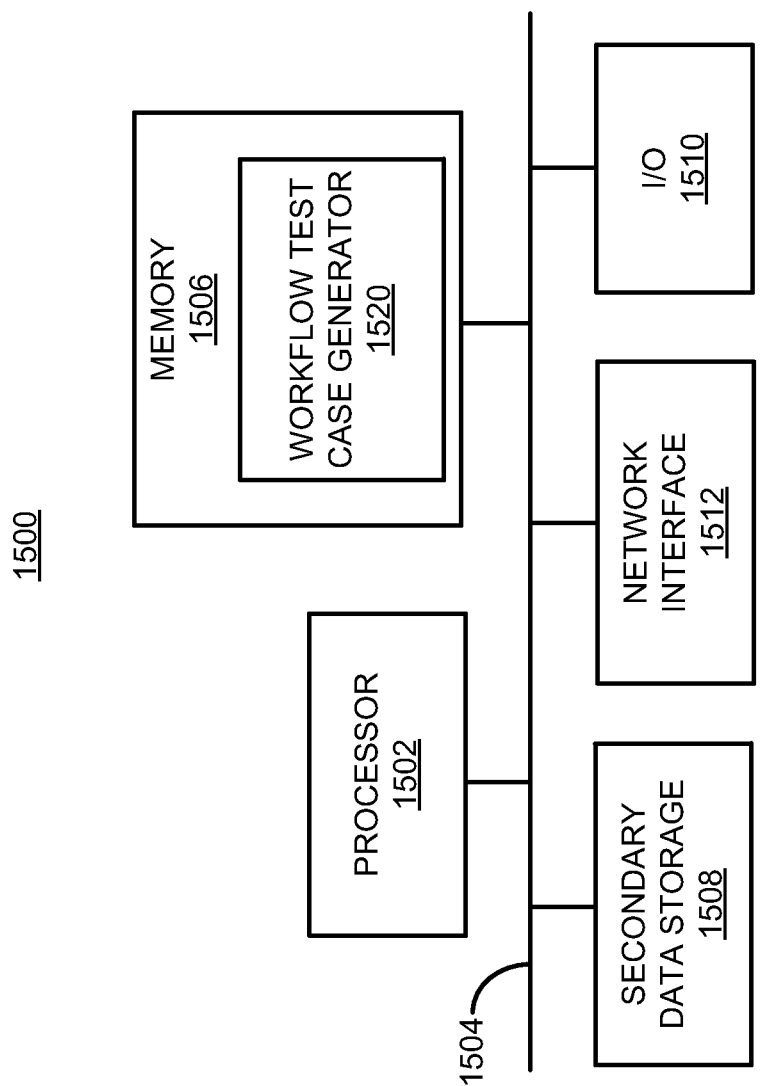
FIG. 15 illustrates a computer system, according to an example of the present disclosure.

FIG. 15 shows a computer system 1500 that may be used with the examples described herein. The computer system may represent a generic platform that includes components that may be in a server or another computer system. The computer system 1500 may be used as a platform for the system 100. The computer system 1500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1500 may include a processor 1502 that may implement or execute machine readable instructions performing some or all of the methods, functions and other processes described herein. Commands and data from the processor 1502 may be communicated over a communication bus 1504. The computer system may also include a main memory 1506, such as a random access memory (RAM), where the machine readable instructions and data for the processor 1502 may reside during runtime, and a secondary data storage 1508, which may be non-volatile and stores machine readable instructions and data. The memory and data storage are examples of computer readable mediums. The memory 1506 may include a workflow test case generator 1520 including machine readable instructions residing in the memory 1506 during runtime and executed by the processor 1502. The workflow test case generator 1520 may include the elements of the system 100 shown in FIG. 1.

The computer system 1500 may include an I/O device 1510, such as a keyboard, a mouse, a display, etc. The computer system may include a network interface 1512 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A workflow test case generation system comprising:
a flow extractor, executed by at least one hardware processor, to
receive an intermediate output of a workflow,
wherein the intermediate output of the workflow references a plurality of workflow building blocks that provide a specified functionality at each step of the workflow, and
wherein the workflow building blocks are utilized by a computer system to create the workflow by generating, by the computer system, code for the workflow, and
analyze workflow definitions of the intermediate output of the workflow to generate a graph structure that represents the workflow;
a flow analyzer, executed by the at least one hardware processor, to
receive building block attributes, wherein the building block attributes include an identification of attributes for the plurality of workflow building blocks, and wherein the building block attributes further include a building block name, an assigned use case name, and routing details for each workflow building block of the plurality of workflow building blocks,
analyze
the building block attributes by using test scripts that are specific to a type of a workflow building block of the plurality of workflow building blocks, and the graph structure that represents the workflow to generate building block and attribute information for the workflow, and analyze the building block and attribute information and the graph structure that represents the workflow to generate all possible test paths for the workflow, wherein the test paths represent at least one of paths or lateral branches of the workflow;

a test artifact generator, executed by the at least one hardware processor, to analyze the building block and attribute information, the test paths, and a plurality of test case templates to generate test artifacts that include testing to be performed for the workflow;

a test artifact applicator, executed by the at least one hardware processor, to apply the test artifacts to the workflow; and a workflow modifier, executed by the at least one hardware processor, to
analyze the application of the test artifacts to the workflow to determine a compliance of the workflow with a predetermined set of compliance requirements, and
modify the workflow in response to a determination that the workflow is not in compliance with at least one of the predetermined set of compliance requirements.

2. The workflow test case generation system according to claim 1, wherein a workflow building block of the plurality of workflow building blocks includes a service level agreement (SLA).

3. The workflow test case generation system according to claim 1, wherein the test case templates are associated with building blocks or sets of building blocks, and wherein the test case templates define tests that are to be performed for the associated building blocks or the sets of building blocks.

4. The workflow test case generation system according to claim 1, wherein the test artifact generator is to analyze the building block and attribute information, the test paths, and a plurality of test case templates to generate test artifacts that include testing to be performed for the workflow by
using the test case templates to extract properties of each workflow building block of the plurality of workflow building blocks, and
applying heuristics to generate the test artifacts, wherein the heuristics include an identification of each workflow building block of the plurality of workflow building blocks, an identification of associated attributes of each workflow building block of the plurality of workflow building blocks, and population of the test case templates based on data from the identification of each workflow building block of the plurality of workflow building blocks, and the identification of associated attributes of each workflow building block of the plurality of workflow building blocks.

5. The workflow test case generation system according to claim 1, wherein the test artifact generator is to further output the test artifacts in a human readable format.

6. The workflow test case generation system according to claim 5, wherein the human readable format is an Excel Spreadsheet (XLS) format.

7. The workflow test case generation system according to claim 1, wherein the flow extractor is to generate the graph structure that represents the workflow by identifying start node and end node details from the intermediate output of the workflow, wherein the start node and end node details respectively include a start node Xpath tag and an end node Xpath tag, and wherein the start node details are used to obtain successive intermediate node details that are used to further obtain the end node details.

8. The workflow test case generation system according to claim 1, wherein the flow extractor is to generate the graph structure that represents the workflow by merging main and sub-flows of the intermediate output of the workflow.

9. The workflow test case generation system according to claim 1, further comprising:
a workflow management system, executed by the at least one hardware processor, to
generate the workflow;
ascertain, for the workflow, an exception that arises in the workflow; and
utilize, for the exception that arises in the workflow, the workflow building block that includes a ticket that marks the exception that arises in the workflow.

10. The workflow test case generation system according to claim 1, further comprising:
a workflow management system, executed by the at least one hardware processor, to
generate the workflow;
ascertain, for the workflow, an assignment task associated with a work object in a worklist associated with the workflow; and
utilize, for the assignment task associated with the work object in the worklist associated with the workflow, the workflow building block that includes an assignment.

11. The workflow test case generation system according to claim 1, further comprising:
a workflow management system, executed by the at least one hardware processor, to
generate the workflow;
ascertain, for the workflow, an activity that is performed in the workflow without user assignment; and
utilize, for the activity that is performed in the workflow without user assignment, the workflow building block that includes a utility.

12. The workflow test case generation system according to claim 1, wherein the flow analyzer is executed by the at least one hardware processor to:
determine whether the type of the workflow building block includes a router by analyzing tags; and
based on a determination that the type of the workflow building block includes the router, analyze the building block attributes by using test scripts that are specific to a router.

13. The workflow test case generation system according to claim 1, wherein each of the test artifacts includes unit test case information, use-case identification, at least one rule that is executed for a test artifact, a rule type, a precondition, steps that are to be executed for a test artifact, and expected results for a corresponding unit test case.

14. A method for workflow test case generation, the method comprising:
receiving, by a flow extractor that is executed by at least one hardware processor, an intermediate output of a workflow,
wherein the intermediate output of the workflow references a plurality of workflow building blocks that provide a specified functionality at each step of the workflow, and
wherein the workflow building blocks are utilized by a computer system to create the workflow by generating, by the computer system, code for the workflow;

analyzing, by the flow extractor, workflow definitions of the intermediate output of the workflow to generate a graph structure that represents the workflow;

receiving, by a flow analyzer that is executed by the at least one hardware processor, building block attributes, wherein the building block attributes include an identification of attributes for the plurality of workflow building blocks, and wherein the building block attributes further include a building block name, an assigned use case name, and routing details for each workflow building block of the plurality of workflow building blocks;

analyzing, by the flow analyzer,
the building block attributes by using test scripts that are specific to a type of a workflow building block of the plurality of workflow building blocks, and
the graph structure that represents the workflow to generate building block and attribute information for the workflow;

analyzing, by the flow analyzer, the building block and attribute information and the graph structure that represents the workflow to generate all possible test paths for the workflow, wherein the test paths represent at least one of paths or lateral branches of the workflow;

analyzing, by a test artifact generator that is executed by the at least one hardware processor, the building block and attribute information, the test paths, and a plurality of test case templates to generate test artifacts that include testing to be performed for the workflow;

applying, by a test artifact applicator that is executed by the at least one hardware processor, the test artifacts to the workflow;

analyzing, by a workflow modifier that is executed by the at least one hardware processor, the application of the test artifacts to the workflow to determine a compliance of the workflow with a predetermined set of compliance requirements; and modifying, by the workflow modifier, the workflow in response to a determination that the workflow is not in compliance with at least one of the predetermined set of compliance requirements.

15. The method for workflow test case generation according to claim 14, wherein analyzing, by the test artifact generator, the building block and attribute information, the test paths, and the plurality of test case templates to generate the test artifacts that include testing to be performed for the workflow, further comprises:

using the test case templates to extract properties of each workflow building block of the plurality of workflow building blocks; and applying heuristics to generate the test artifacts.

16. The method for workflow test case generation according to claim 14, wherein analyzing, by the test artifact generator, the building block and attribute information, the test paths, and the plurality of test case templates to generate the test artifacts that include testing to be performed for the workflow, further comprises:

using natural language processing to generate the test artifacts in a human readable format.

17. A non-transitory computer readable medium having stored thereon machine readable instructions for workflow test case generation, the machine readable instructions when executed cause at least one hardware processor to:

determine an output of a workflow,
wherein the output of the workflow references a plurality of workflow building blocks that provide a specified functionality at each step of the workflow, and
wherein the workflow building blocks are utilized by a computer system to create the workflow by generating, by the computer system, code for the workflow;

generate a graph structure that represents the workflow based on an analysis of workflow definitions of the output of the workflow;

analyze building block attributes by using test scripts that are specific to a type of a workflow building block of the plurality of workflow building blocks, and the graph structure that represents the workflow to generate building block and attribute information for the workflow, wherein the building block attributes include an identification of attributes for the plurality of workflow building blocks, and wherein the building block attributes further include a building block name, an assigned use case name, and routing details for each workflow building block of the plurality of workflow building blocks;

generate all possible test paths for the workflow based on an analysis of the building block and attribute information and the graph structure that represents the workflow, wherein the test paths represent at least one of paths or lateral branches of the workflow;

generate test artifacts that include testing to be performed for the workflow based on an analysis of the building block and attribute information, the test paths, and a plurality of test case templates;

analyze an application of the test artifacts to the workflow to determine a compliance of the workflow with a predetermined set of compliance requirements; and modify the workflow in response to a determination that the workflow is not in compliance with at least one of the predetermined set of compliance requirements.

18. The non-transitory computer readable medium according to claim 17, wherein the output of the workflow includes an Extensible Markup Language (XML) schema format.

19. The non-transitory computer readable medium according to claim 17, wherein the machine readable instructions to generate the graph structure that represents the workflow based on the analysis of workflow definitions of the output of the workflow further comprise machine readable instructions to:

generate the graph structure that represents the workflow by identifying start node and end node details from the output of the workflow.

20. The non-transitory computer readable medium according to claim 17, wherein the test case templates are associated with building blocks or sets of building blocks, and wherein the test case templates define tests that are to be performed for the associated building blocks or the sets of building blocks.

* * * * *